(12) United States Patent
Starr et al.

(10) Patent No.: US 6,807,581 B1
(45) Date of Patent: Oct. 19, 2004

(54) INTELLIGENT NETWORK STORAGE INTERFACE SYSTEM

(75) Inventors: Daryl D. Starr, Milpitas, CA (US); Clive M. Philbrick, San Jose, CA (US); Laurence B. Boucher, Saratoga, CA (US)

(73) Assignee: Alacritech, Inc., San Jose, CA (US)

( * ) Notice: Subject to any disclaimer, the term of this patent is extended or adjusted under 35 U.S.C. 154(b) by 864 days.

(21) Appl. No.: 09/675,484

(22) Filed: Sep. 29, 2000

(51) Int. Cl.$^7$ .............................................. G06F 15/16
(52) U.S. Cl. .................... 709/250; 709/227; 709/230
(58) Field of Search ............................... 709/250, 253, 709/213, 227, 230; 711/118, 119, 120–126

(56) References Cited

U.S. PATENT DOCUMENTS

| | | | |
|---|---|---|---|
| 4,366,538 A | 12/1982 | Johnson et al. | 364/200 |
| 4,991,133 A | 2/1991 | Davis et al. | 364/900 |
| 5,058,110 A | 10/1991 | Beach et al. | 370/85.6 |
| 5,097,442 A | 3/1992 | Ward et al. | 365/78 |
| 5,163,131 A | 11/1992 | Row et al. | 395/200 |
| 5,212,778 A | 5/1993 | Dally et al. | 395/400 |
| 5,280,477 A | 1/1994 | Trapp | 370/85.1 |
| 5,289,580 A | 2/1994 | Latif et al. | 395/275 |

(List continued on next page.)

FOREIGN PATENT DOCUMENTS

| | | |
|---|---|---|
| WO | WO98/19412 | 5/1998 |
| WO | WO98/50852 | 11/1998 |

(List continued on next page.)

OTHER PUBLICATIONS

IEEE article entitled "Afterburner: A network–independent card provides architectural support for high–performance protocols." by Chris Dalton et al., dated Jul. 1993, 8 pages, copyright 1993 IEEE.

(List continued on next page.)

*Primary Examiner*—Zarni Maung
(74) *Attorney, Agent, or Firm*—Mark Lauer; T. Lester Wallace; Silicon Edge Law Group, LLP

(57) ABSTRACT

An interface device is connected to a host by an I/O bus and provides hardware and processing mechanisms for accelerating data transfers between a network and a storage unit, while controlling the data transfers by the host. The interface device includes hardware circuitry for processing network packet headers, and can use a dedicated fast-path for data transfer between the network and the storage unit, the fast-path set up by the host. The host CPU and protocol stack avoids protocol processing for data transfer over the fast-path, freeing host bus bandwidth, and the data need not cross the I/O bus, freeing I/O bus bandwidth. The storage unit may include RAID or other multiple drive configurations and may be connected to the INIC by a parallel channel such as SCSI or by a serial channel such as Ethernet or Fibre Channel. The interface device contains a file cache that stores data transferred between the network and storage unit, with organization of data in the interface device file cache controlled by a file system on the host. Additional interface devices may be connected to the host via the I/O bus, with each additional interface device having a file cache controlled by the host file system, and providing additional network connections and/or being connected to additional storage units.

24 Claims, 23 Drawing Sheets

U.S. PATENT DOCUMENTS

| | | | |
|---|---|---|---|
| 5,303,344 A | 4/1994 | Yokoyama et al. | 395/200 |
| 5,412,782 A | 5/1995 | Hausman et al. | 395/250 |
| 5,448,566 A | 9/1995 | Richter et al. | 370/94.1 |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,548,730 A | 8/1996 | Young et al. | 395/280 |
| 5,579,503 A | 11/1996 | Osborne | 395/446 |
| 5,592,622 A | 1/1997 | Isfeld et al. | 395/200.02 |
| 5,629,933 A | 5/1997 | Delp et al. | 370/411 |
| 5,634,127 A | 5/1997 | Cloud et al. | 395/680 |
| 5,664,114 A | 9/1997 | Krech, Jr. et al. | 395/200.64 |
| 5,699,317 A | 12/1997 | Sartore et al. | 365/230.06 |
| 5,701,516 A | 12/1997 | Cheng et al. | 395/842 |
| 5,751,715 A | 5/1998 | Chan et al. | 370/455 |
| 5,771,349 A | 6/1998 | Picazo, Jr. et al. | 395/188.01 |
| 5,790,804 A | 8/1998 | Osborne | 395/200.75 |
| 5,794,061 A | 8/1998 | Hansen et al. | 395/800.01 |
| 5,802,580 A | 9/1998 | McAlpine | 711/149 |
| 5,809,328 A | 9/1998 | Nogales et al. | 395/825 |
| 5,812,775 A | 9/1998 | Van Seeters et al. | 395/200.43 |
| 5,815,646 A | 9/1998 | Purcell et al. | 395/163 |
| 5,913,028 A | 6/1999 | Wang et al. | 395/200.33 |
| 5,931,918 A | 8/1999 | Row et al. | 709/300 |
| 5,935,205 A | 8/1999 | Murayama et al. | 709/216 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,991,299 A | 11/1999 | Radogna et al. | 370/392 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,021,446 A | 2/2000 | Gentry, Jr. | 709/303 |
| 6,026,452 A | 2/2000 | Pitts | 710/56 |
| 6,044,438 A | 3/2000 | Olnowich | 711/130 |
| 6,047,356 A | 4/2000 | Anderson et al. | 711/129 |
| 6,057,863 A | 5/2000 | Olarig | 345/520 |
| 6,065,096 A | 5/2000 | Day et al. | 711/114 |
| 6,067,569 A | 5/2000 | Khaki et al. | 709/224 |
| 6,085,234 A | 7/2000 | Pitts et al. | 709/217 |
| 6,173,333 B1 | 1/2001 | Jolitz et al. | |
| 6,301,612 B1 | 10/2001 | Selitrennikoff et al. | 709/220 |
| 6,345,301 B1 | 2/2002 | Burns et al. | 709/230 |
| 6,356,951 B1 | 3/2002 | Gentry, Jr. | 709/250 |
| 6,389,468 B1 | 5/2002 | Muller et al. | 709/226 |
| 6,427,169 B1 | 7/2002 | Elzur | 709/224 |
| 6,434,651 B1 | 8/2002 | Gentry, Jr. | 710/260 |
| 6,449,656 B1 | 9/2002 | Elzur et al. | 709/236 |
| 6,453,360 B1 | 9/2002 | Muller et al. | 709/250 |
| 6,470,397 B1 | 10/2002 | Shah et al. | 709/250 |
| 6,697,868 B2 * | 2/2004 | Craft et al. | 709/230 |
| 2001/0004354 A1 | 6/2001 | Jolitz | |
| 2001/0025315 A1 | 9/2001 | Jolitz | |

FOREIGN PATENT DOCUMENTS

| | | |
|---|---|---|
| WO | WO01/04770 | 1/2001 |
| WO | WO01/05107 | 1/2001 |
| WO | WO01/05116 | 1/2001 |
| WO | WO01/05123 | 1/2001 |

OTHER PUBLICATIONS

U.S. Provisional patent application No.: 60/201,626, Titled: SCSI Encapsulation Protocol, Filed: May 12, 2000, Inventor: Andrew W. Wilson.

U.S. Provisional patent application No.: 60/163,266, Titled: SCSI Over Ethernet, Filed: Nov. 3, 1999, Inventor: Andrew Wilson.

U.S. Provisional patent application No.: 60/189,639, Titled: Ethernet Storage Protocols for Computer Networks, Filed: Mar. 14, 2000, Inventors: Andrew W. Wilson et al.

U.S. patent application No.: 09/490,630, Titled: Methods for Implementing an Ethernet Storage Protocol in Computer Networks, Filed: Jan. 24, 2000, Inventors: Andrew W. Wilson et al., Assignee: Adaptec, Inc.

U.S. patent application No.: 09/490,629, Titled: Ethernet Storage Protocol Networks, Filed: Jan. 24, 2000, Inventors: Andrew W. Wilson et al., Assignee: Adaptec, Inc.

Article from Rice University entitled "LRP: A New Network Subsystem Architecture for Server Systems", by Peter Druschel and Gaurav Banga, 14 pages.

Internet RFC/STD/FYI/BCP Archives article with heading "RFC2140" entitled "TCP Control Block Interdependence", web address http://www.faqs.org/rfcs/rfc2140.html, 9 pages, printed Sep. 20, 2002.

Internet pages entitled, Technical White Paper—Xpoint's Disk–to–LAN Acceleration Solution for Windows NT Server, printed Jun. 5, 1997.

InterProphet article entitled, "Frequently Asked Questions," http://interprophet.com/faq.html, printed Jun. 14, 1999.

Digital Technical Journal article entitled, "DART: Fast Application–level Networking via Data–copy Avoidance," by Robert J. Walsh, 1997, printed Jun. 3, 1999.

Internet article entitled, "Comparison of Novell Netware and TCP/IP Protocol Architectures," by Janique S. Carborne, written Jul. 16, 1995, printed Apr. 10, 1998.

Form 10–K for Exelan, Inc., for the fiscal year ending Dec. 31, 1987 (10 pages).

Form 10–K for Exelan, Inc., for the fiscal year ending Dec. 31, 1988 (10 pages).

Internet pages of Xpoint Technologies www.xpoint.com website, 5 pages, printed Dec. 19, 1997.

Internet pages entitled: Asante and 100BASE–T Fast Ethernet. 7 pages, printed May 27, 1997.

Internet pages entitled: A Guide to the Paragon XP/S–A7 Supercomputer at Indiana University, 13 pages, printed Dec. 21, 1998.

Richard Stevens, "TCP/IP Illustrated, vol. 1, The Protocols", pp. 325–326 (1994).

VT8501 Apollo MVP4 Documentation, VIA Technologies, Inc., pp. i–iv, 1–11, cover and copyright page, revision 1.3 (Feb. 1, 2000).

Internet pages entitled: Northbridge/Southbridge vs. Intel Hub Architecture, 4 pages, printed Feb. 19, 2001.

Gigabit Ethernet Technical Brief, Achieving End–To–End Performance. Alteon Networks, Inc., First Edition, Sep. 1996.

Internet pages directed to: Technical Brief on Alteon Ethernet Gigabit NIC Technology, www.alteon.com, 14 pages, printed Mar. 15, 1997.

Internet pages from iReady News Archives entitled, "iReady Rounding Out Management Team With Two Key Executives," 2 pages, downloaded Nov. 28, 1998.

"Toshiba Delivers First Chips to Make Consumer Devices Internet–Ready Based On iReady's Design," Press Release Oct., 1988, 3 pages, downloaded Nov. 28, 1998.

Internet pages from iReady Products, website http://www.ireadyco.com/products.html, 2 pages, downloaded Nov. 25, 1998.

Iready News Archives, "Toshiba, iReady shipping Internet Chip," 1 page, posted at 9:39 AM PT, Oct. 14, 1998.

Iready corporation, The I–1000 Internet Tuner, Modular Internet Design System, 2 pages, date unknown.

Interprophet website, http://www.interprophet.com/technology.html, 17 pages, downloaded Mar. 1, 2000.

NEWSwatch–iready Internet Tuner to Web Enable Devices, Nov. 5, 1996, 2 pages, printed Nov. 2, 1998.

David Lammers, EETimes, Jun. 13, 1997, Tuner for Toshiba, Toshiba taps iReady for Internet Tuner. 3 pages, printed Nov. 2, 1998.

CIBC World Markets article by J. Berlino, entitled "Computers: Storage," dated Aug. 7, 2000.

Merrill Lynch article by S. Milunovich, entitled "Storage Industry Overview," dated May 10, 2000.

Article by S. Taylor entitled "Montreal start–up battles data storage bottleneck," Mar. 5, 2000.

Internet–Draft of J. Satran et al. entitled "SCSI/TCP (SCSI over TCP)," dated Feb. 2000.

U.S. patent application Ser. No. 08/964,304 of R. Napolitano et al. for File Array Storage Architecture, filed Nov. 4, 1997.

Article by D. Hitz et al. entitled "File System Design for an NFS File Server Appliance."

Adaptec article entitled "Adaptec Announces Etherstorage Technology," printed Jun. 14, 2000.

Adaptec article entitled "EtherStorage Frequently Asked Questions," printed Jul. 19, 2000.

Adaptec article entitled "EtherStorage White Paper," printed Jul. 19, 2000.

* cited by examiner

INTELLIGENT NETWORK STORAGE INTERFACE SYSTEM

BACKGROUND

Over the past decade, advantages of and advances in network computing have encouraged tremendous growth of computer networks, which has in turn spurred more advances, growth and advantages. With this growth, however, dislocations and bottlenecks have occurred in utilizing conventional network devices. For example, a CPU of a computer connected to a network may spend an increasing proportion of its time processing network communications, leaving less time available for other work. In particular, demands for moving file data between the network and a storage unit of the computer, such as a disk drive, have accelerated. Conventionally such data is divided into packets for transportation over the network, with each packet encapsulated in layers of control information that are processed one layer at a time by the CPU of the receiving computer. Although the speed of CPUs has constantly increased, this protocol processing of network messages such as file transfers can consume most of the available processing power of the fastest commercially available CPU.

This situation may be even more challenging for a network file server whose primary function is to store and retrieve files, on its attached disk or tape drives, by transferring file data over the network. As networks and databases have grown, the volume of information stored at such servers has exploded, exposing limitations of such server-attached storage. In addition to the above-mentioned problems of protocol processing by the host CPU, limitations of parallel data channels such as conventional small computer system interface (SCSI) interfaces have become apparent as storage needs have increased. For example, parallel SCSI interfaces restrict the number of storage devices that can be attached to a server and the distance between the storage devices and the server.

As noted in the book by Tom Clark entitled "Designing Storage Area Networks," (copyright 1999) incorporated by reference herein, one solution to the limits of server-attached parallel SCSI storage devices involves attaching other file servers to an existing local area network (LAN) in front of the network server. This network-attached storage (NAS) allows access to the NAS file servers from other servers and clients on the network, but may not increase the storage capacity dedicated to the original network server. Conversely, NAS may increase the protocol processing required by the original network server, since that server may need to communicate with the various NAS file servers. In addition, each of the NAS file servers may in turn be subject to the strain of protocol processing and the limitations of storage interfaces.

Storage area networking (SAN) provides another solution to the growing need for file transfer and storage over networks, by replacing daisy-chained SCSI storage devices with a network of storage devices connected behind a server. Instead of conventional network standards such as Ethernet or Fast Ethernet, SANs deploy an emerging networking standard called Fibre Channel (FC). Due to its relatively recent introduction, however, many commercially available FC devices are incompatible with each other. Also, a FC network may dedicate bandwidth for communication between two points on the network, such as a server and a storage unit, the bandwidth being wasted when the points are not communicating.

NAS and SAN as known today can be differentiated according to the form of the data that is transferred and stored. NAS devices generally transfer data files to and from other file servers or clients, whereas device level blocks of data may be transferred over a SAN. For this reason, NAS devices conventionally include a file system for converting between files and blocks for storage, whereas a SAN may include storage devices that do not have such a file system.

Alternatively, NAS file servers can be attached to an Ethernet-based network dedicated to a server, as part of an Ethernet SAN. Marc Farley further states, in the book "Building Storage Networks," (copyright 2000) incorporated by reference herein, that it is possible to run storage protocols over Ethernet, which may avoid Fibre Channel incompatibility issues. Increasing the number of storage devices connected to a server by employing a network topology such as SAN, however, increases the amount of protocol processing that must be performed by that server. As mentioned above, such protocol processing already strains the most advanced servers.

An example of conventional processing of a network message such as a file transfer illustrates some of the processing steps that slow network data storage. A network interface card (NIC) typically provides a physical connection between a host and a network or networks, as well as providing media access control (MAC) functions that allow the host to access the network or networks. When a network message packet sent to the host arrives at the NIC, MAC layer headers for that packet are processed and the packet undergoes cyclical redundancy checking (CRC) in the NIC. The packet is then sent across an input/output (I/O) bus such as a peripheral component interconnect (PCI) bus to the host, and stored in host memory. The CPU then processes each of the header layers of the packet sequentially by running instructions from the protocol stack. This requires a trip across the host memory bus initially for storing the packet and then subsequent trips across the host memory bus for sequentially processing each header layer. After all the header layers for that packet have been processed, the payload data from the packet is grouped in a file cache with other similarly-processed payload packets of the message. The data is reassembled by the CPU according to the file system as file blocks for storage on a disk or disks. After all the packets have been processed and the message has been reassembled as file blocks in the file cache, the file is sent, in blocks of data that may be each built from a few payload packets, back over the host memory bus and the I/O bus to host storage for long term storage on a disk, typically via a SCSI bus that is bridged to the I/O bus.

Alternatively, for storing the file on a SAN, the reassembled file in the file cache is sent in blocks back over the host memory bus and the I/O bus to an I/O controller configured for the SAN. For the situation in which the SAN is a FC network, a specialized FC controller is provided which can send the file blocks to a storage device on the SAN according to Fibre Channel Protocol (FCP). For the situation in which the file is to be stored on a NAS device, the file may be directed or redirected to the NAS device, which processes the packets much as described above but employs the CPU, protocol stack and file system of the NAS device, and stores blocks of the file on a storage unit of the NAS device.

Thus, a file that has been sent to a host from a network for storage on a SAN or NAS connected to the host typically requires two trips across an I/O bus for each message packet of the file. In addition, control information in header layers of each packet may cross the host memory bus repeatedly as it is temporarily stored, processed one layer at a time, and then sent back to the I/O bus. Retrieving such a file from storage on a SAN in response to a request from a client also conventionally requires significant processing by the host CPU and file system.

SUMMARY

An interface device such as an intelligent network interface card (INIC) for a local host is disclosed that provides hardware and processing mechanisms for accelerating data transfers between a network and a storage unit, while control of the data transfers remains with the host. The interface device includes hardware circuitry for processing network packet headers, and can use a dedicated fast-path for data transfer between the network and the storage unit, the fast-path set up by the host. The host CPU and protocol stack avoid protocol processing for data transfer over the fast-path, releasing host bus bandwidth from many demands of the network and storage subsystem. The storage unit, which may include a redundant array of independent disks (RAID) or other configurations of multiple drives, may be connected to the interface device by a parallel channel such as SCSI or by a serial channel such as Ethernet or Fibre Channel, and the interface device may be connected to the local host by an I/O bus such as a PCI bus. An additional storage unit may be attached to the local host by a parallel interface such as SCSI.

A file cache is provided on the interface device for storing data that may bypass the host, with organization of data in the interface device file cache controlled by a file system on the host. With this arrangement, data transfers between a remote host and the storage units can be processed over the interface device fast-path without the data passing between the interface device and the local host over the I/O bus. Also in contrast to conventional communication protocol processing, control information for fast-path data does not travel repeatedly over the host memory bus to be temporarily stored and then processed one layer at a time by the host CPU. The host may thus be liberated from involvement with a vast majority of data traffic for file reads or writes on host controlled storage units.

Additional interface devices may be connected to the host via the I/O bus, with each additional interface device having a file cache controlled by the host file system, and providing additional network connections and/or being connected to additional storage units. With plural interface devices attached to a single host, the host can control plural storage networks, with a vast majority of the data flow to and from the host-controlled networks bypassing host protocol processing, travel across the I/O bus, travel across the host bus, and storage in the host memory. In one example, storage units may be connected to such an interface device by a Gigabit Ethernet network, offering the speed and bandwidth of Fibre Channel without the drawbacks, and benefiting from the large installed base and compatibility of Ethernet-based networks.

DETAILED DESCRIPTION

Figure 1:
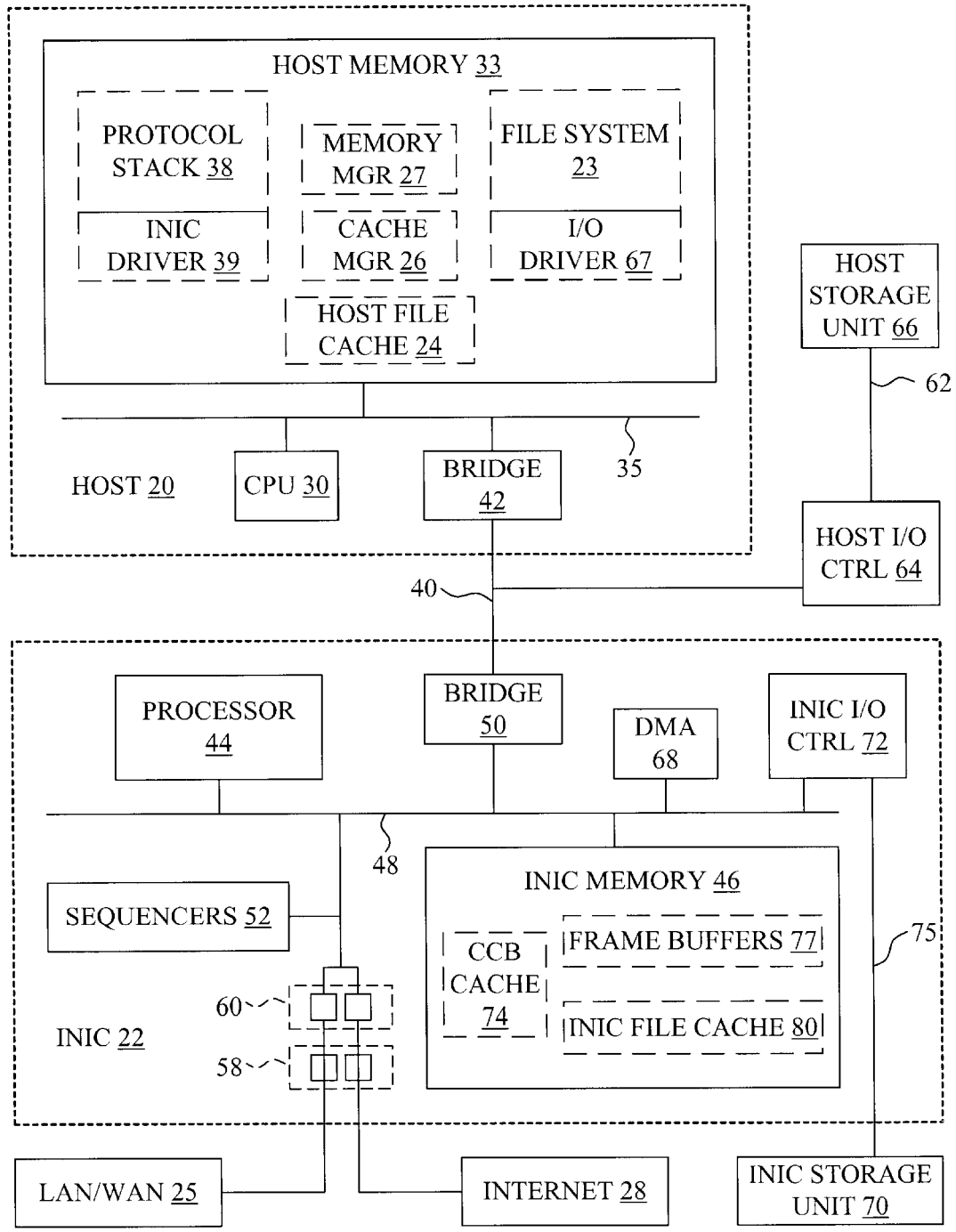
FIG. 1 is a plan view diagram of a network storage system including a host computer connected to plural networks by an intelligent network interface card (INIC) having an I/O controller and file cache for a storage unit attached to the INIC.

An overview of a network data communication system in accordance with the present invention is shown in FIG. 1. A host computer 20 is connected to an interface device such as intelligent network interface card (INIC) 22 that may have one or more ports for connection to networks such as a local or wide area network 25, or the Internet 28. The host 20 contains a processor such as central processing unit (CPU) 30 connected to a host memory 33 by a host bus 35, with an operating system, not shown, residing in memory 33, for overseeing various tasks and devices, including a file system 23. Also stored in host memory 33 is a protocol stack 38 of instructions for processing of network communications and a INIC driver 39 that communicates between the INIC 22 and the protocol stack 38. A cache manager 26 runs under the control of the file system 23 and an optional memory manager 27, such as the virtual memory manager of Windows® NT or 2000, to store and retrieve file portions, termed file streams, on a host file cache 24.

The host 20 is connected to the INIC 22 by an I/O bus 40, such as a PCI bus, which is coupled to the host bus 35 by a host I/O bridge 42. The INIC includes an interface processor 44 and memory 46 that are interconnected by an INIC bus 48. INIC bus 48 is coupled to the I/O bus 40 with an INIC I/O bridge 50. Also connected to INIC bus 48 is a set of hardware sequencers 52 that provide upper layer processing of network messages. Physical connection to the LAN/WAN 25 and the Internet 28 is provided by conventional physical layer hardware PHY 58. Each of the PHY 58 units is connected to a corresponding unit of media access control (MAC) 60, the MAC units each providing a conventional data link layer connection between the INIC and one of the networks.

A host storage unit 66, such as a disk drive or collection of disk drives and corresponding controller, may be coupled to the I/O bus 40 by a conventional I/O controller 64, such as a SCSI adapter. A parallel data channel 62 connects controller 64 to host storage unit 66. Alternatively, host storage unit 66 may be a redundant array of independent disks (RAID), and I/O controller 64 may be a RAID controller. An I/O driver 67, e.g., a SCSI driver module, operating under command of the file system 23 interacts with controller 64 to read or write data on host storage unit 66. Host storage unit 66 preferably contains the operating system code for the host 20, including the file system 23, which may be cached in host memory 33.

An INIC storage unit 70, such as a disk drive or collection of disk drives and corresponding controller, is coupled to the INIC bus 48 via a matching interface controller, INIC I/O controller 72, which in turn is connected by a parallel data channel 75 to the INIC storage unit. INIC I/O controller 72 may be a SCSI controller, which is connected to INIC storage unit 70 by a parallel data channel 75. Alternatively, INIC storage unit 70 may be a RAID system, and I/O controller 72 may be a RAID controller, with multiple or branching data channels 75. Similarly, I/O controller 72 may be a SCSI controller that is connected to a RAID controller for the INIC storage unit 70. In another implementation, INIC storage unit 70 is attached to a Fibre Channel (FC) network 75, and I/O controller 72 is a FC controller. Although INIC I/O controller 72 is shown connected to INIC bus 48, I/O controller 72 may instead be connected to I/O bus 40. INIC storage unit 70 may optionally contain the boot disk for the host 20, from which the operating system kernel is loaded. INIC memory 46 includes frame buffers 77 for temporary storage of packets received from or transmitted to a network such as LAN/WAN 25. INIC memory 46 also includes an interface file cache, INIC file cache 80, for temporary storage of data stored on or retrieved from INIC storage unit 70. Although INIC memory 46 is depicted in FIG. 1 as a single block for clarity, memory 46 may be formed of separate units disposed in various locations in the INIC 22, and may be composed of dynamic random access memory (DRAM), static random access memory (SRAM), read only memory (ROM) and other forms of memory.

The file system 23 is a high level software entity that contains general knowledge of the organization of information on storage units 66 and 70 and file caches 24 and 80, and provides algorithms that implement the properties and performance of the storage architecture. The file system 23 logically organizes information stored on the storage units 66 and 70, and respective file caches 24 and 80, as a hierarchical structure of files, although such a logical file may be physically located in disparate blocks on different disks of a storage unit 66 or 70. The file system 23 also manages the storage and retrieval of file data on storage units 66 and 70 and file caches 24 and 80. I/O driver 67 software operating on the host 20 under the file system interacts with controllers 64 and 72 for respective storage units 66 and 70 to manipulate blocks of data, i.e., read the blocks from or write the blocks to those storage units. Host file cache 24 and INIC file cache 80 provide storage space for data that is being read from or written to the storage units 66 and 70, with the data mapped by the file system 23 between the physical block format of the storage units 66 and 70 and the logical file format used for applications. Linear streams of bytes associated with a file and stored in host file cache 24 and INIC file cache 80 are termed file streams. Host file cache 24 and INIC file cache 80 each contain an index that lists the file streams held in that respective cache.

The file system 23 includes metadata that may be used to determine addresses of file blocks on the storage units 66 and 70, with pointers to addresses of file blocks that have been recently accessed cached in a metadata cache. When access to a file block is requested, for example by a remote host on LAN/WAN 25, the host file cache 24 and INIC file cache 80 indexes are initially referenced to see whether a file stream corresponding to the block is stored in their respective caches. If the file stream is not found in the file caches 24 or 80, then a request for that block is sent to the appropriate storage unit address denoted by the metadata. One or more conventional caching algorithms are employed by cache manager 26 for the file caches 24 and 80 to choose which data is to be discarded when the caches are full and new data is to be cached. Caching file streams on the INIC file cache 80 greatly reduces the traffic over both I/O bus 40 and data channel 75 for file blocks stored on INIC storage unit 70.

When a network packet that is directed to the host 20 arrives at the INIC 22, the headers for that packet are processed by the sequencers 52 to validate the packet and create a summary or descriptor of the packet, with the summary prepended to the packet and stored in frame buffers 77 and a pointer to the packet stored in a queue. The summary is a status word (or words) that describes the protocol types of the packet headers and the results of checksumming. Included in this word is an indication whether or not the frame is a candidate for fast-path data flow. Unlike prior art approaches, upper layer headers containing protocol information, including transport and session layer information, are processed by the hardware logic of the sequencers 52 to create the summary. The dedicated logic circuits of the sequencers allow packet headers to be processed virtually as fast as the packets arrive from the network.

The INIC then chooses whether to send the packet to the host memory 33 for "slow-path" processing of the headers by the CPU 30 running protocol stack 38, or to send the packet data directly to either INIC file cache 80 or host file cache 24, according to a "fast-path." The fast-path may be selected for the vast majority of data traffic having plural packets per message that are sequential and error-free, and avoids the time consuming protocol processing of each packet by the CPU, such as repeated copying of the data and repeated trips across the host memory bus 35. For the fast-path situation in which the packet is moved directly into the INIC file cache 80, additional trips across the host bus 35 and the I/O bus 40 are also avoided. Slow-path processing allows any packets that are not conveniently transferred by the fast-path of the INIC 22 to be processed conventionally by the host 20.

In order to provide fast-path capability at the host 20, a connection is first set up with the remote host, which may include handshake, authentication and other connection initialization procedures. A communication control block (CCB) is created by the protocol stack 38 during connection initialization procedures for connection-based messages, such as typified by TCP/IP or SPX/IPX protocols. The CCB includes connection information, such as source and destination addresses and ports. For TCP connections a CCB comprises source and destination media access control (MAC) addresses, source and destination IP addresses, source and destination TCP ports and TCP variables such as timers and receive and transmit windows for sliding window protocols. After a connection has been set up, the CCB is passed by INIC driver 39 from the host to the INIC memory 46 by writing to a command register in that memory 46, where it may be stored along with other CCBs in CCB cache 74. The INIC also creates a hash table corresponding to the cached CCBs for accelerated matching of the CCBs with packet summaries.

When a message, such as a file write, that corresponds to the CCB is received by the INIC, a header portion of an initial packet of the message is sent to the host 20 to be processed by the CPU 30 and protocol stack 38. This header portion sent to the host contains a session layer header for the message, which is known to begin at a certain offset of the packet, and optionally contains some data from the packet. The processing of the session layer header by a session layer of protocol stack 38 identifies the data as belonging to the file and indicates the size of the message, which are used by the file system to determine whether to cache the message data in the host file cache 24 or INIC file cache 80, and to reserve a destination for the data in the selected file cache. If any data was included in the header portion that was sent to the host, it is then stored in the destination. A list of buffer addresses for the destination in the selected file cache is sent to the INIC 22 and stored in or along with the CCB. The CCB also maintains state information regarding the message, such as the length of the message and the number and order of packets that have been processed, providing protocol and status information regarding each of the protocol layers, including which user is involved and storage space for per-transfer information.

Once the CCB indicates the destination, fast-path processing of packets corresponding to the CCB is available.

After the above-mentioned processing of a subsequently received packet by the sequencers 52 to generate the packet summary, a hash of the packet summary is compared with the hash table, and if necessary with the CCBs stored in CCB cache 74, to determine whether the packet belongs to a message for which a fast-path connection has been set up. Upon matching the packet summary with the CCB, assuming no exception conditions exist, the data of the packet, without network or transport layer headers, is sent by direct memory access (DMA) unit 68 to the destination in file cache 80 or file cache 24 denoted by the CCB.

At some point after all the data from the message has been cached as a file stream in INIC file cache 80 or host file cache 24, the file stream of data is then sent, by DMA unit 68 under control of the file system 23, from that file cache to the INIC storage unit 70 or host storage unit 66, under control of the file system. Commonly, file streams cached in host file cache 24 are stored on INIC storage unit 66, while file streams cached in INIC file cache 80 are stored on INIC storage unit 70, but this arrangement is not necessary. Subsequent requests for file transfers may be handled by the same CCB, assuming the requests involve identical source and destination IP addresses and ports, with an initial packet of a write request being processed by the host CPU to determine a location in the host file cache 24 or INIC file cache 80 for storing the message. It is also possible for the file system to be configured to earmark a location on INIC storage unit 70 or host storage unit 66 as the destination for storing data from a message received from a remote host, bypassing the file caches.

Figure 2:
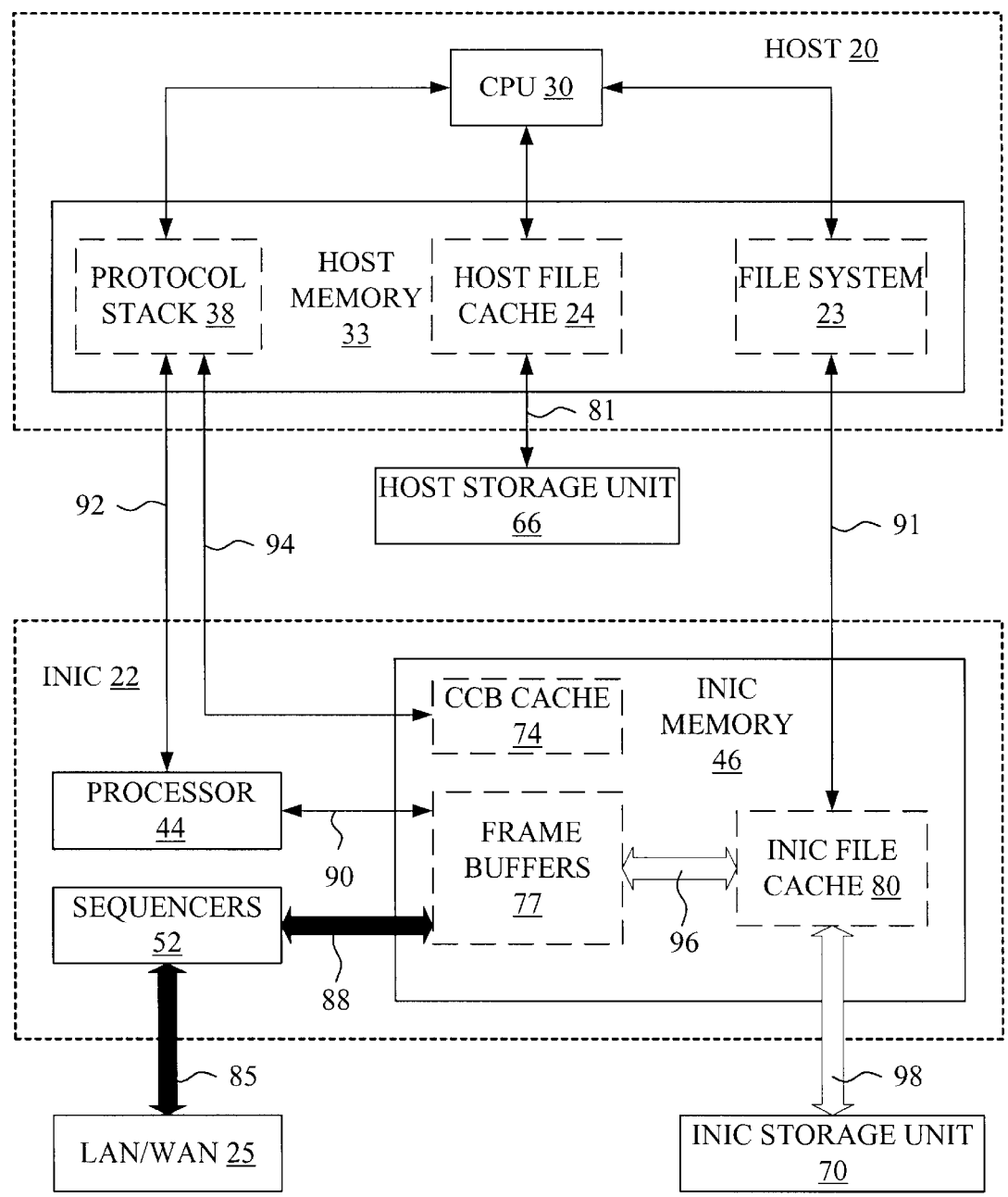
FIG. 2 is a plan view diagram of the functioning of an INIC and host computer in transferring data between plural networks according to the present invention.

An approximation for promoting a basic understanding of the present invention is depicted in FIG. 2, which segregates the main paths for information flow for the network data storage system of FIG. 1 by showing the primary type of information for each path. FIG. 2 shows information flow paths consisting primarily of control information with thin arrows, information flow paths consisting primarily of data with thick white arrows, and information flow paths consisting of both control information and data with thick black arrows. Note that host 20 is primarily involved with control information flows, while the INIC storage unit 70 is primarily involved with data transfer.

Information flow between a network such as LAN/WAN 25 and the INIC 22 may include control information and data, and so is shown with thick black arrow 85. Examples of information flow 81 between network such as LAN/WAN 25 and the INIC 22 include control information, such as connection initialization dialogs and acknowledgements, as well as file reads or writes, which are sent as packets containing file data encapsulated in control information. The sequencers 52 process control information from file writes and pass data and control information to and from INIC frame buffers 77, and so those transfers are represented with thick black arrow 88. Control information regarding the data stored in frame buffers 77 is operated on by the processor 44, as shown by thin arrow 90, and control information such as network connection initialization packets and session layer headers are sent to the protocol stack 38, as shown by thin arrow 92. When a connection has been set up by the host, control information regarding that connection, such as a CCB, may be passed between host protocol stack 38 and INIC memory 46, as shown by thin arrow 94. Temporary storage of data being read from or written to INIC storage unit 70 is provided by INIC file cache 80 and frame buffers 77, as illustrated by thick white arrows 96 and 98. Control and knowledge of all file streams that are stored on INIC file cache 80 is provided by file system 23, as shown by thin arrow 91. In an embodiment for which host storage unit 66 does not store network accessible data, file system information is passed between host file cache 24 and host storage unit 66, as shown by arrow 81. Other embodiments, not shown in this figure, may not include a host storage unit, or alternatively may use a host storage unit and host file cache primarily for network file transfers.

It is apparent from FIG. 2 that the data of network file reads or writes primarily pass through the INIC 22 and avoid the host 20, whereas control information is primarily passed between the host and INIC. This segregation of control information from data for file transfers between a network and storage allows the host to manage the file transfers that flow through the INIC between the network and storage, while the INIC provides a fast-path for those file transfers that accelerates data throughput. Increased throughput afforded by the INIC data fast-path allows host and INIC to function, for example, as a database server for high bandwidth applications such as video, in addition to functioning as a file server.

Figure 3:
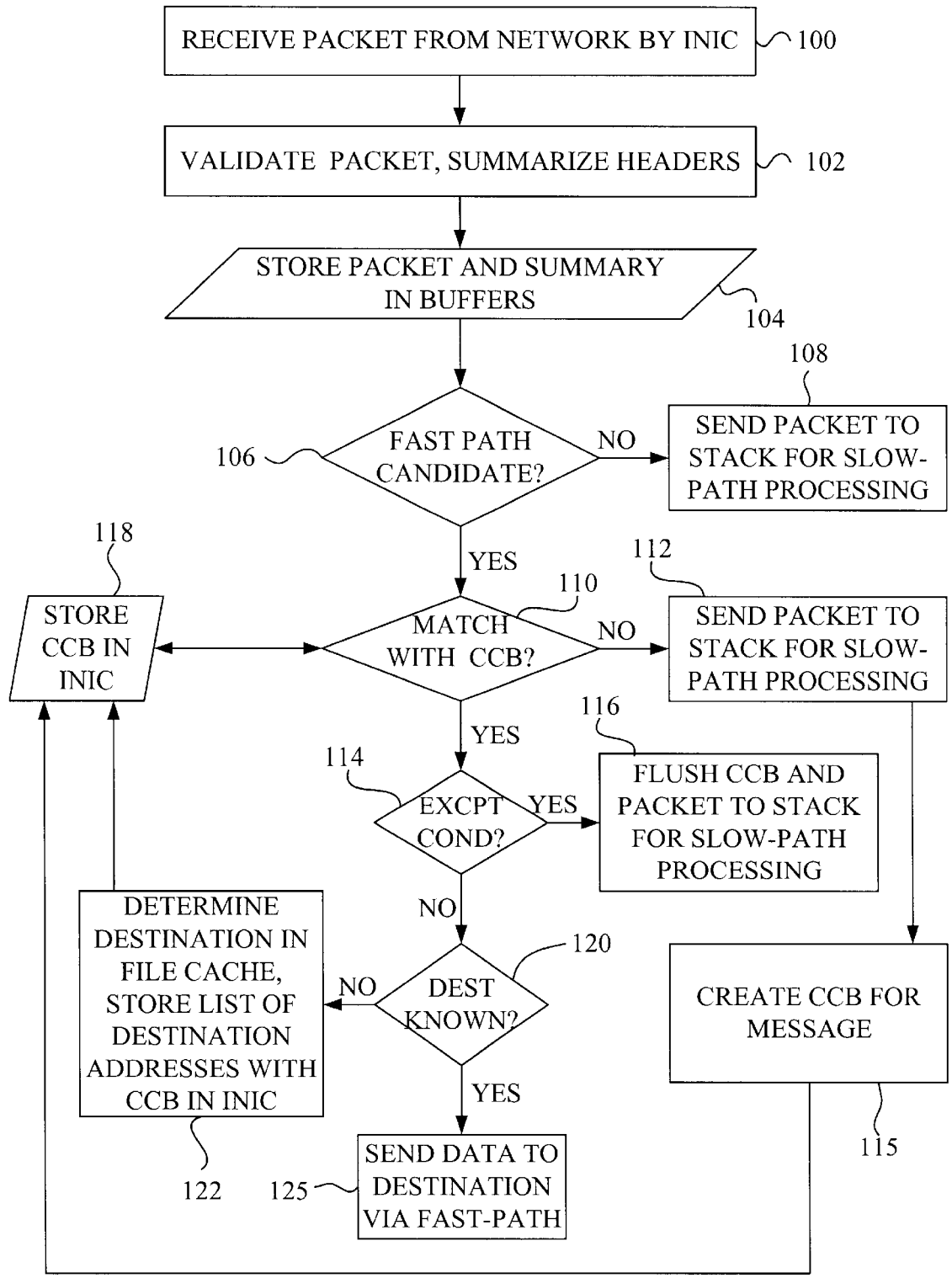
FIG. 3 is a flowchart depicting a sequence of steps involved in receiving a message packet from a network by the system of FIG. 1.

FIG. 3 illustrates some steps performed by the system of FIG. 1 for storing messages received from a network. A packet sent from a network such as LAN/WAN 25 is first received 100 at the INIC 22 by the PHY unit 58, and the MAC unit 60 performs link layer processing such as verifying that the packet is addressed to host 20. The network, transport and, optionally, session layer headers of that packet are then processed 102 by the sequencers 52, which validate the packet and create a summary of those headers. The summary is then added to the packet and stored 104 in one of the frame buffers 77. The processor 44 then determines 106 whether the packet is a candidate for fast-path processing, by checking the packet summary. Whether a packet is a fast path candidate may be determined simply by the protocol of the packet, as denoted in the summary. For the case in which the packet is not a fast-path candidate, the packet is sent 108 across the I/O bus 40 to host memory 33 for processing the headers of the packet by the CPU 30 running instructions from the protocol stack 38.

For the case in which the packet is a fast-path candidate, the packet summary is then compared 110 with a set of fast-path connections being handled by the card, each connection represented as a CCB, by matching the summary with CCB hashes and the CCB cache. If the summary does not match a CCB held in the INIC memory, the packet is sent 112 to host memory for processing the headers of the packet by the CPU running instructions from the protocol stack. For the case in which the packet is part of a connection initialization dialog, the packet may be used to create 115 a CCB for the message. If the packet summary instead matches a CCB held in the INIC memory, the processor checks 114 for exception conditions which may include, e.g., fragmented or out of order packets and, if such an exception condition is found, flushes 116 the CCB and the packet to the host protocol stack 38 for protocol processing. For the case in which a packet summary matches a CCB but a destination for the packet is not indicated with the CCB, the session layer header of the packet is sent to the host protocol stack 38 to determine 122 a destination in the host file cache or INIC file cache, according to the file system, with a list of cache addresses for that destination stored with the CCB in the INIC. The INIC also checks 114 the packet summary for exception conditions that would cause the CCB to be flushed to the host 116 and the packet to be sent to the host for processing by the stack.

For the case in which a packet summary matches a CCB and a destination for the packet is stored with the CCB, and no exception conditions exist, the data from the packet is sent 125 by DMA to the destination in the host file cache or the INIC file cache designated by the CCB. The message packet in this case bypasses processing of the headers by the host protocol processing stack, providing fast-path data transfer. For the situation in which the data of the packets is sent via the fast-path to the INIC file cache and INIC storage, the packets not only avoid protocol processing by the host but do not cross the I/O bus or the host memory bus, providing tremendous savings of time, CPU processing and bus traffic compared to traditional network storage.

Figure 4:
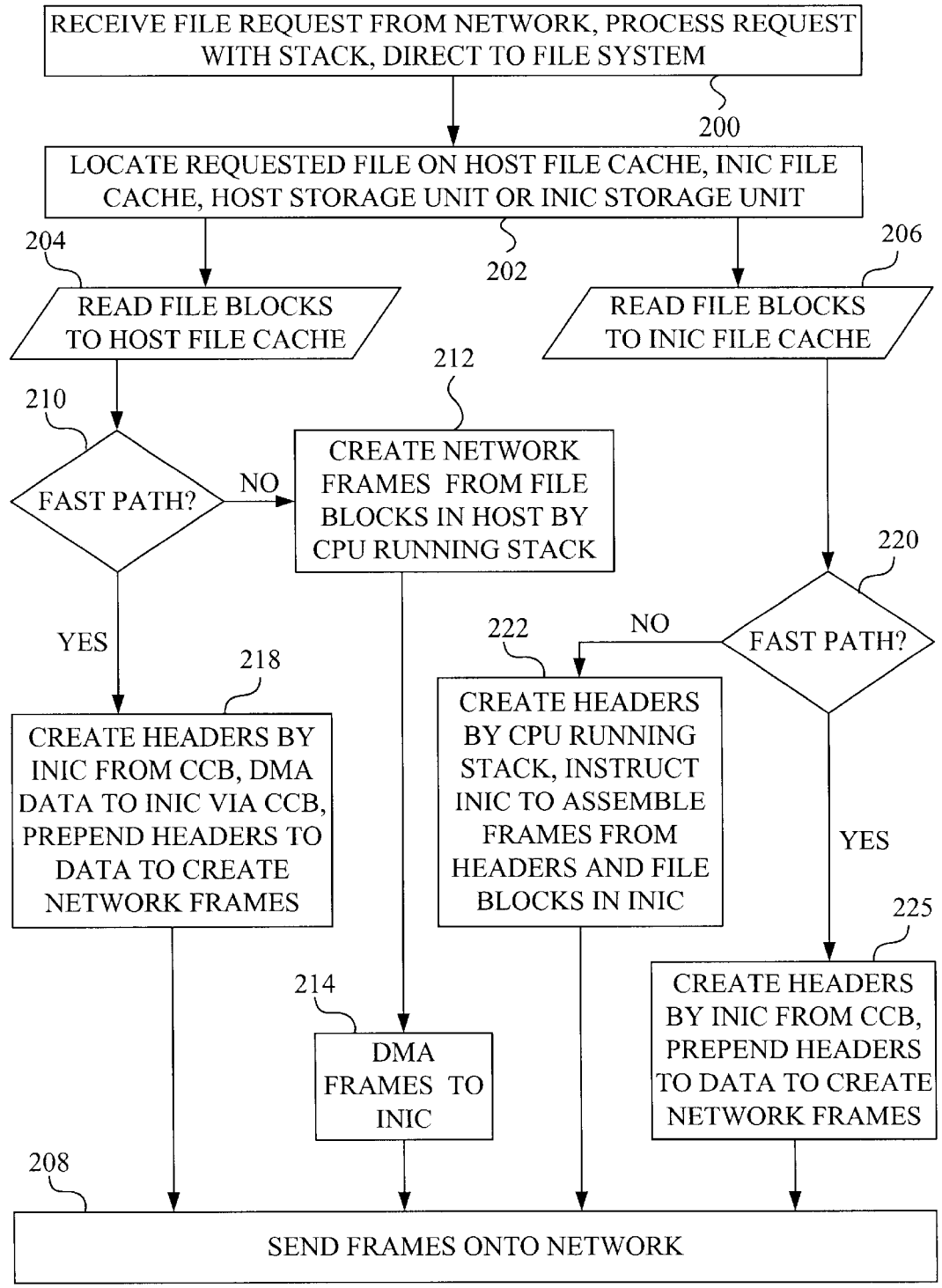
FIG. 4 is a flowchart depicting a sequence of steps involved in transmitting a message packet to a network in response to a request from the network by the system of FIG. 1.

FIG. 4 shows some steps performed by the system of FIG. 1 for retrieving a file or part of a file from host storage unit 66 or INIC storage unit 70 in response to a request 200 from a network, such as LAN/WAN 25. First, the request packet is processed by the protocol stack, which directs the request to the file system. The file system locates 202 the file indicated in the request, including determining whether the file streams corresponding to the file are cached in INIC file cache or host file cache, and if the file streams are not located in one of the caches, determining whether the block or blocks corresponding to the file are stored on the host storage unit or the INIC storage unit. Assuming the file streams are not located in one of the caches, the file blocks are then read to the host file cache 204 or read to the INIC file cache 206. For most situations, file blocks stored on the host storage unit will be read into the host file cache and file blocks stored on the INIC storage unit will be read into the INIC file cache, but this mapping is not necessary. It may be desirable, for example, to read file blocks stored on the host storage unit into the INIC file cache, thereby reducing traffic on the host memory bus.

For the case in which the file blocks are cached in the host file cache, the host determines 210 whether to send the file by fast-path processing, by noting whether a CCB corresponding to the request is being held by the INIC. If the host chooses not to use the fast-path but to send the file from the host by the slow-path, the CPU runs the protocol stack to create headers for the data held in the host file cache, and then adds the headers and checksums to the data, creating network frames 212 for transmission over the network by the INIC, as is conventional. The INIC then uses DMA to acquire the frames from the host 214, and the INIC then sends the frames 208 onto the network. If instead the file is to be sent by the fast-path, the INIC processor uses the CCB to create headers and checksums and to DMA frame-sized segments of data from the host file cache, and then prepends the headers and checksums to the data segments to create network frames 218, freeing the host from protocol processing.

Similarly, if the file blocks are cached in the INIC file cache, the host determines 220 whether to send the file by fast-path processing, by noting whether a CCB is being held by the INIC. If the host chooses not to use the fast-path 222, the host CPU prepares headers and checksums for the file block data, storing the headers in host memory. The host then instructs the INIC to assemble network frames by prepending headers from host memory to data in INIC memory, creating message frames that are then sent over the network by the INIC. Even for this non-fast-path case, the data is not moved over the I/O bus to the host and back to the INIC, reducing I/O traffic compared to a conventional transmit of file blocks located on a storage unit connected to a host by an I/O bus or network. If instead the fast-path is selected 225, the INIC processor creates headers and checksums corresponding to the CCB, and prepends the headers and checksums to data segments from the INIC file cache to create network frames, which are then sent 208 by the INIC over the network. In this fast-path case the host is relieved of protocol processing and host memory bus traffic as well as being relieved of I/O bus traffic.

Figure 5:
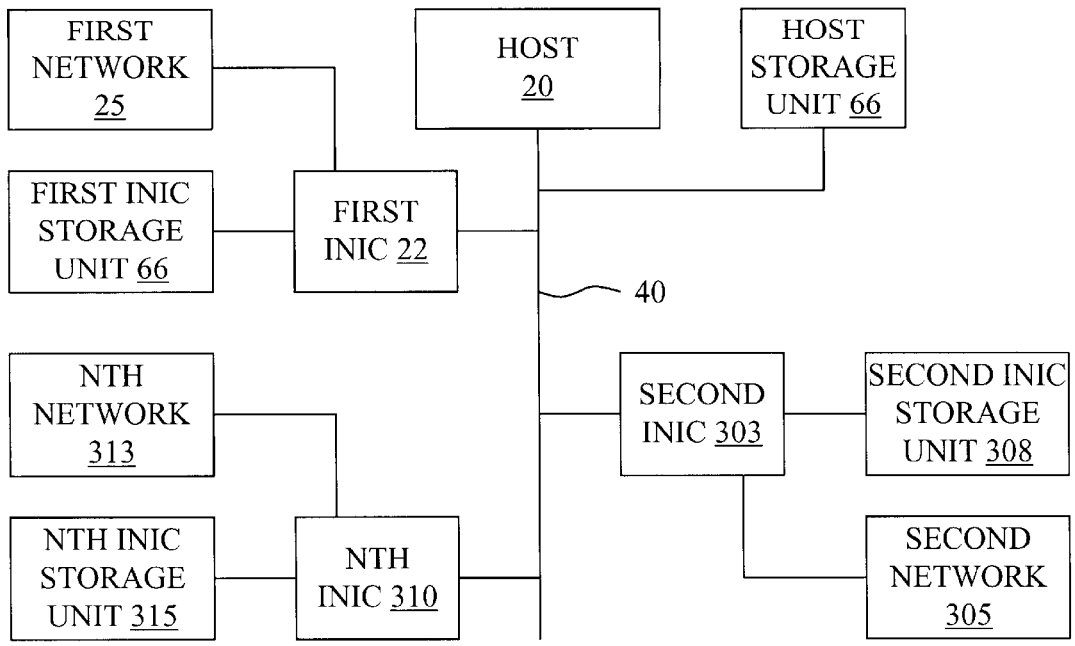
FIG. 5 is a plan view diagram of a network storage system including a host computer connected to plural networks and plural storage units by plural INICs managed by the host computer.

FIG. 5 shows a network storage system in which the host 20 is connected via the I/O bus 40 to several I/O INICs in addition to the first INIC 22. Each of the INICs in this example is connected to at least one network and has at least one storage unit attached. Thus a second INIC 303 is connected to I/O bus 40 and provides an interface for the host to a second network 305. First INIC 22 may, as mentioned above, actually have several network ports for connection to several networks, and second INIC 303 may also be connected to more than one network 305, but for clarity only a single network connection is shown in this figure for each INIC. Second INIC 303 contains an I/O controller, such as a SCSI adapter, that is coupled to second INIC storage unit 308. Alternatively, second INIC storage unit 308 may be a RAID system, and second INIC 303 may contain or be connected to a RAID controller. In another embodiment, second INIC 303 contains a FC controller that is coupled to second INIC storage unit 308 by a FC network loop or FC adapter and network line. A number N of INICs may be connected to the host 20 via the I/O bus, as depicted by $N^{th}$ INIC 310. $N^{th}$ INIC 310 contains circuitry and control instructions providing a network interface and a storage interface that are coupled to $N^{th}$ network 313 and $N^{th}$ storage unit 315, respectively. $N^{th}$ INIC 310 may have several network ports for connection to several networks, and second $N^{th}$ INIC 310 may also be connected to more than one network. Storage interface circuitry and control instructions of $N^{th}$ INIC 310 may for example include a SCSI controller, that is coupled to $N^{th}$ INIC storage unit 315 by a SCSI cable. Alternatively, $N^{th}$ INIC storage unit 315 may be a RAID system, and $N^{th}$ INIC 310 may contain or be connected to a RAID controller. In yet another embodiment, $N^{th}$ INIC 310 contains a FC controller that is coupled to $N^{th}$ INIC storage unit 315 by a FC adapter and FC network line.

The file system may be arranged so that network accessible files are stored on one of the network storage units 66, 305 or 315, and not on the host storage unit 66, which instead includes the file system code and protocol stack, copies of which are cached in the host. With this configuration, the host 20 controls network file transfers but a vast majority of the data in those files may be transferred by fast-path through INIC 22, 303 or 310 without ever entering the host. For a situation in which file blocks are transferred between a network and a storage unit that are connected to the same INIC, the file data may never cross the I/O bus or host memory bus. For a situation in which a file is transferred between a network and a storage unit that are connected to the different INICs, the file blocks may be sent by DMA over the I/O bus to or from a file cache on the INIC that is connected to the storage unit, still avoiding the host memory bus. In this worst case situation that is usually avoided, data may be transferred from one INIC to another, which involves a single transfer over the I/O bus and still avoids the host memory bus, rather than two I/O bus transfers and repeated host memory bus accesses that are conventional.

Figure 6:
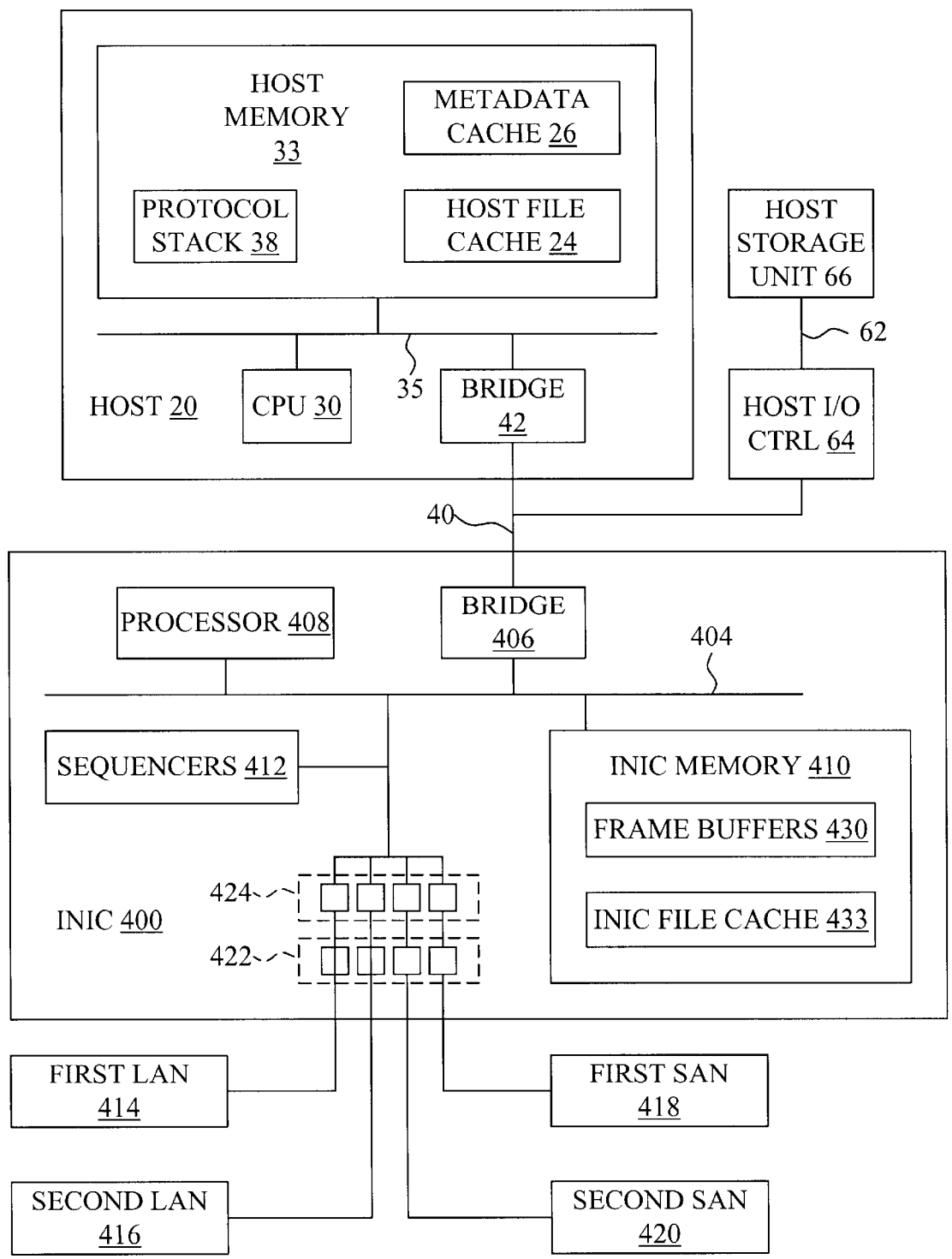
FIG. 6 is a plan view diagram of a network storage system including a host computer connected to plural LANs and plural SANs by an intelligent network interface card (INIC) without an I/O controller.

FIG. 6 shows a network storage system including an INIC 400 that provides network communication connections and network storage connections, without the need for the INIC I/O controller 72 described above. For conciseness, the host 20 and related elements are illustrated as being unchanged from FIG. 1, although this is not necessarily the case. The INIC in this example has network connections or ports that are connected to first LAN 414, second LAN 416, first SAN 418 and second SAN 420. Any or all of the networks 414, 416, 418 and 420 may operate in accordance with Ethernet, Fast Ethernet or Gigabit Ethernet standards. Gigabit Ethernet, examples of which are described by 802.3z and 802.3ab standards, may provide data transfer rates of 1 gigabit/second or 10 gigabits/second, or possibly greater rates in the future. SANs 418 and 420 may run a storage protocol such as SCSI over TCP/IP or SCSI Encapsulation Protocol. One such storage protocol is described by J. Satran et al. in the Internet-Draft of the Internet Engineering Task Force (IETF) entitled "iSCSI (Internet SCSI)," June 2000, which in an earlier Internet-Draft was entitled "SCSI/TCP (SCSI over TCP)," February 2000, both documents being incorporated by reference herein. Another such protocol, termed EtherStorage and promoted by Adaptec, employs SCSI Encapsulation Protocol (SEP) at the session layer, and either TCP or SAN transport protocol (STP) at the transport layer, depending primarily upon whether data is being transferred over a WAN or the Internet, for which TCP is used, or data is being transferred over a LAN or SAN, for which STP is used.

The host 20 is connected to the INIC 400 by the I/O bus 40, such as a PCI bus, which is coupled to an INIC bus 404 by an INIC I/O bridge 406, such as a PCI bus interface. The INIC 400 includes a specialized processor 408 connected by the I/O bus 40 to an INIC memory 410. INIC memory 410 includes frame buffers 430 and an INIC file cache 433. Also connected to INIC bus 404 is a set of hardware sequencers 412 that provide processing of network messages, including network, transport and session layer processing. Physical connection to the LANs 414 and 416 and SANs 418 and 420 is provided by conventional physical layer hardware PHY 422. Each of the PHY 422 units is connected to a corresponding unit of media access control (MAC) 424, the MAC units each providing a data link layer connection between the INIC 400 and one of the networks.

Figure 7:
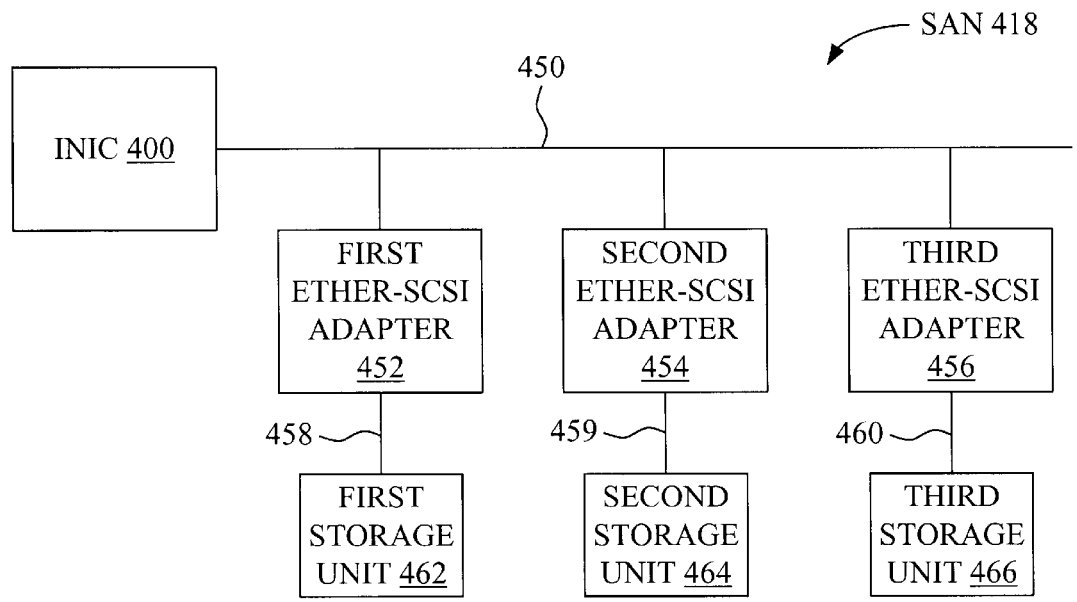
FIG. 7 is a plan view diagram of a one of the SANs of FIG. 6, including Ethernet-SCSI adapters coupled between a network line and a storage unit.

FIG. 7 shows that SAN 418 includes a Gigabit Ethernet line 450, which is connected between INIC 400 and a first Ethernet-SCSI adapter 452, a second Ethernet-SCSI adapter 454, and a third Ethernet-SCSI adapter 456. The Ethernet-SCSI adapters 452, 454 and 456 can create and shutdown TCP connections, send SCSI commands to or receive SCSI commands from INIC 400, and send data to or receive data from INIC 400 via line 450. A first storage unit 462 is connected to first Ethernet-SCSI adapter 452 by a first SCSI cable 458. Similarly, a second storage unit 464 is connected to second Ethernet-SCSI adapter 454 by a second SCSI cable 459, and a third storage unit 466 is connected to second Ethernet-SCSI adapter 456 by a third SCSI cable 460. The storage units 462, 464, and 466 are operated by respective adapters 452, 454 and 456 according to SCSI standards. Each storage unit may contain multiple disk drives daisy chained to their respective adapter.

Figure 8:
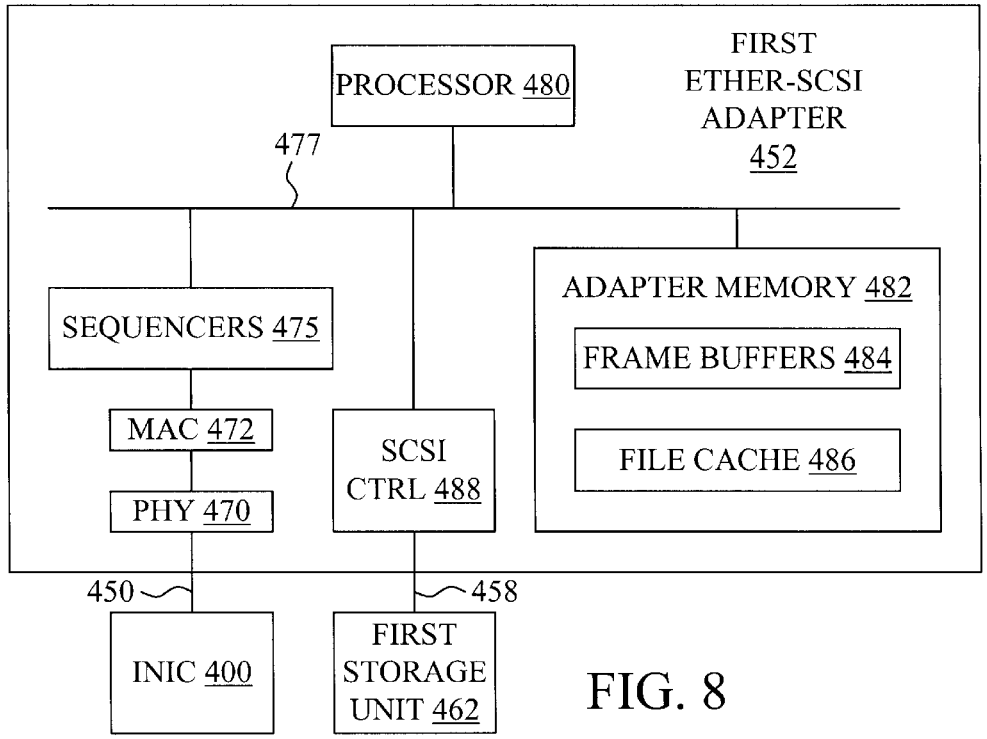
FIG. 8 is a plan view diagram of one of the Ethernet-SCSI adapters of FIG. 6.

FIG. 8 shows details of the first Ethernet-SCSI adapter 452, which in this embodiment is an INIC similar to that shown in FIG. 1. Adapter 452 has a single network port with physical layer connections to network line 450 provided by conventional PHY 470, and media access provided by conventional MAC 472. Processing of network message packet headers, including upper layer processing, is provided by sequencers 475, which are connected via adapter bus 477 to processor 480 and adapter memory 482. Adapter memory 482 includes frame buffers 484 and a file cache 486. Also connected to adapter bus 477 is a SCSI controller, which is coupled to first storage unit 462 by SCSI channel 458.

One difference between adapter 452 and INIC 20 is that adapter 452 is not necessarily connected to a host having a CPU and protocol stack for processing slow-path messages. Connection setup may in this case be handled by adapter 452, for example, by INIC 400 sending an initial packet to adapter 452 during a connection initialization dialog, with the packet processed by sequencers 475 and then sent to processor 480 to create a CCB. Certain conditions that require slow-path processing by a CPU running a software protocol stack are likely to be even less frequent in this environment of communication between adapter 452 and INIC 400. The messages that are sent between adapter 452 and INIC 400 may be structured in accordance with a single or restricted set of protocol layers, such as SCSI/TCP and simple network management protocol (SNMP), and are sent to or from a single source to a single or limited number of destinations. Reduction of many of the variables that cause complications in conventional communications networks affords increased use of fast-path processing, reducing the need at adapter 452 for error processing. Adapter 452 may have the capability to process several types of storage protocols over IP and TCP, for the case in which the adapter 452 may be connected to a host that uses one of those protocols for network storage, instead of being connected to INIC 400. For the situation in which network 450 is not a SAN dedicated to storage transfers but also handles communication traffic, an INIC connected to a host having a CPU running a protocol stack for slow-path packets may be employed instead of adapter 452.

Figure 9:
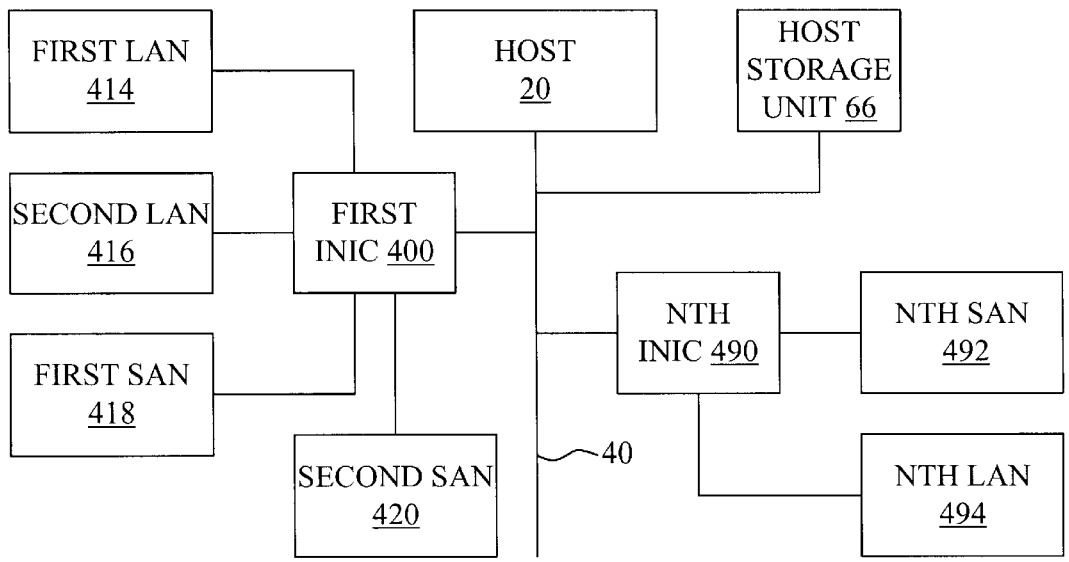
FIG. 9 is a plan view diagram of a network storage system including a host computer connected to plural LANs and plural SANs by plural INICs managed by the host computer.

As shown in FIG. 9, additional INICs similar to INIC 400 may be connected to the host 20 via the I/O bus 40, with each additional INIC providing additional LAN connections and/or being connected to additional SANs. The plural INICs are represented by Nth INIC 490, which is connected to Nth SAN 492 and Nth LAN 494. With plural INICs attached to host 20, the host can control plural storage networks, with a vast majority of the data flow to and from the host controlled networks bypassing host protocol processing, travel across the I/O bus, travel across the host bus, and storage in the host memory.

Figure 10:
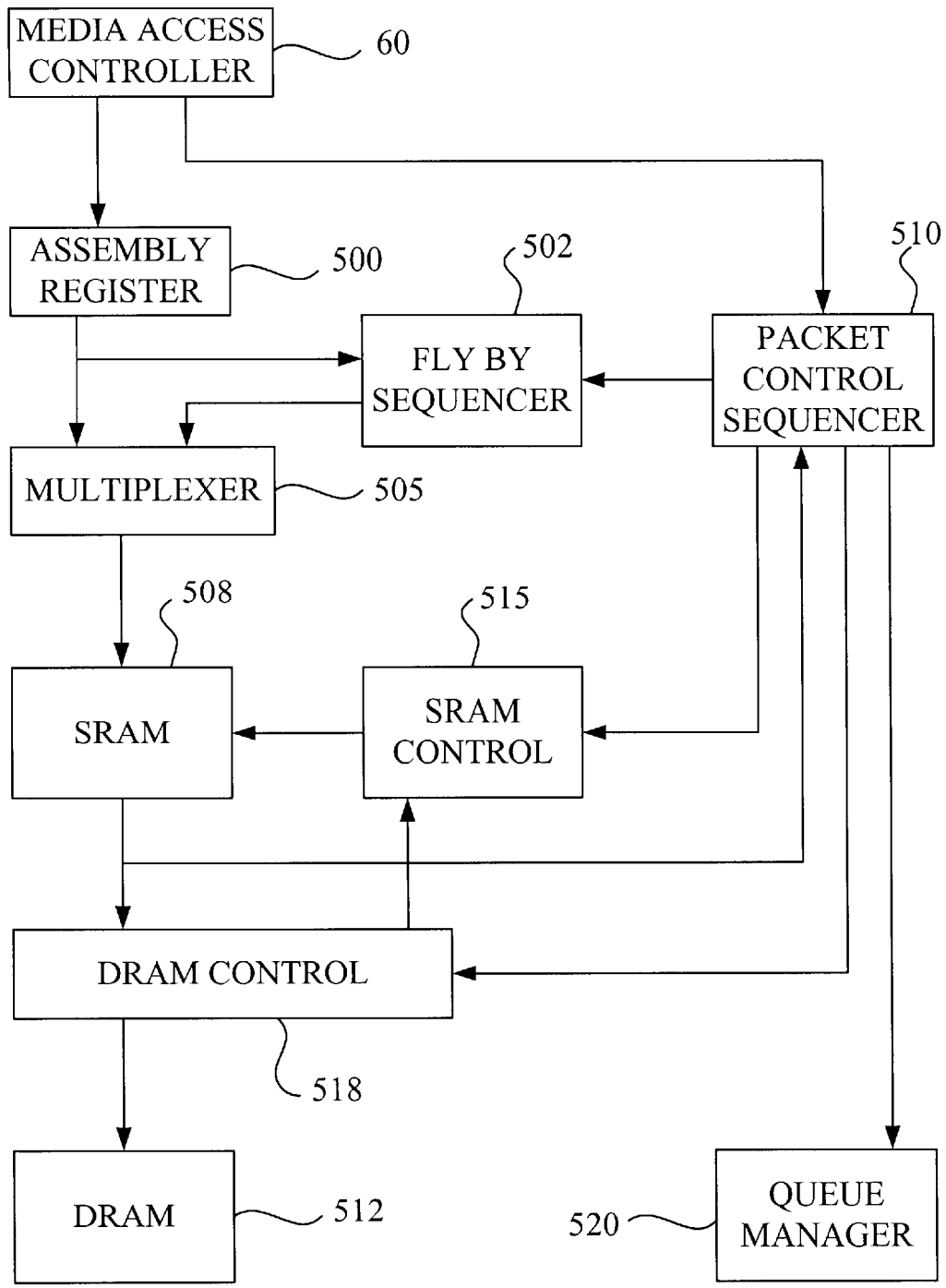
FIG. 10 is a diagram of hardware logic for the INIC embodiment shown in FIG. 1 including a packet control sequencer and a fly-by sequencer.

The processing of message packets received by INIC 22 of FIG. 1 from a network such as network 25 is shown in more detail in FIG. 10. A received message packet first enters the media access controller 60, which controls INIC access to the network and receipt of packets and can provide statistical information for network protocol management. From there, data flows one byte at a time into an assembly register 500, which in this example is 128 bits wide. The data is categorized by a fly-by sequencer 502, as will be explained in more detail with regard to FIG. 11, which examines the bytes of a packet as they fly by, and generates status from those bytes that will be used to summarize the packet. The status thus created is merged with the data by a multiplexer 505 and the resulting data stored in SRAM 508. A packet control sequencer 510 oversees the fly-by sequencer 502, examines information from the media access controller 60, counts the bytes of data, generates addresses, moves status and manages the movement of data from the assembly register 500 to SRAM 508 and eventually DRAM 512. The packet control sequencer 510 manages a buffer in SRAM 508 via SRAM controller 515, and also indicates to a DRAM controller 518 when data needs to be moved from SRAM 508 to a buffer in DRAM 512. Once data movement for the packet has been completed and all the data has been moved to the buffer in DRAM 512, the packet control sequencer 510 will move the status that has been generated in the fly-by sequencer 502 out to the SRAM 508 and to the beginning of the DRAM 512 buffer to be prepended to the packet data. The packet control sequencer 510 then requests a queue manager 520 to enter a receive buffer descriptor into a receive queue, which in turn notifies the processor 44 that the packet has been processed by hardware logic and its status summarized.

Figure 11:
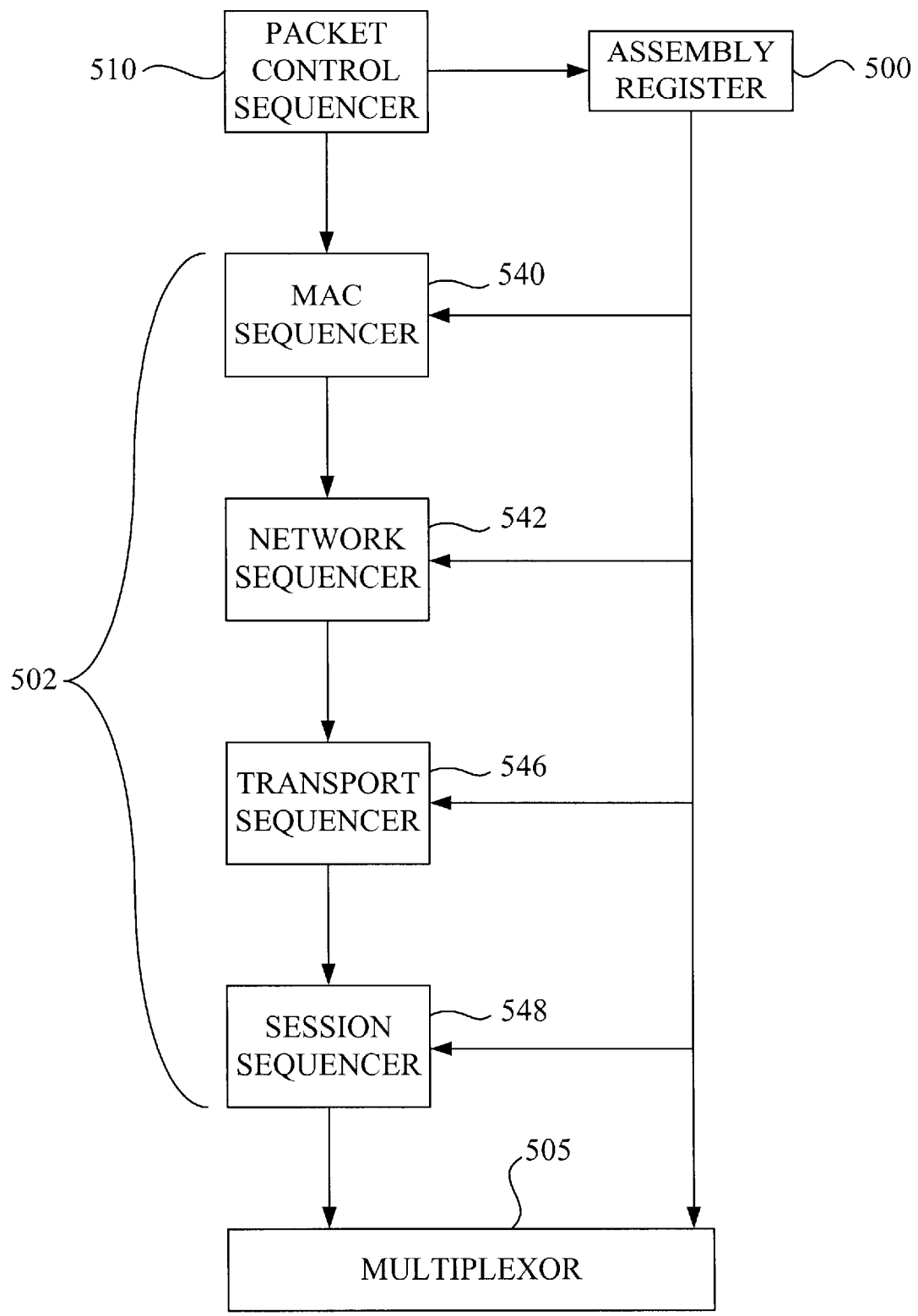
FIG. 11 is a diagram of the fly-by sequencer of FIG. 10 for analyzing header bytes as they are received by the INIC.

FIG. 11 shows that the fly-by sequencer 502 has several tiers, with each tier generally focusing on a particular portion of the packet header and thus on a particular protocol layer, for generating status pertaining to that layer. The fly-by sequencer 502 in this embodiment includes a media access control sequencer 540, a network sequencer 542, a transport sequencer 546 and a session sequencer 548. Sequencers pertaining to higher protocol layers can additionally be provided. The fly-by sequencer 502 is reset by the packet control sequencer 510 and given pointers by the packet control sequencer that tell the fly-by sequencer whether a given byte is available from the assembly register 500. The media access control sequencer 540 determines, by looking at bytes 0–5, that a packet is addressed to host 20 rather than or in addition to another host. Offsets 12 and 13 of the packet are also processed by the media access control sequencer 540 to determine the type field, for example whether the packet is Ethernet or 802.3. If the type field is Ethernet those bytes also tell the media access control sequencer 540 the packet's network protocol type. For the 802.3 case, those bytes instead indicate the length of the entire frame, and the media access control sequencer 540 will check eight bytes further into the packet to determine the network layer type.

For most packets the network sequencer 542 validates that the header length received has the correct length, and checksums the network layer header. For fast-path candidates the network layer header is known to be IP or IPX from analysis done by the media access control sequencer 540. Assuming for example that the type field is 802.3 and the network protocol is IP, the network sequencer 542 analyzes the first bytes of the network layer header, which will begin at byte 22, in order to determine IP type. The first bytes of the IP header will be processed by the network sequencer 542 to determine what IP type the packet involves. Determining that the packet involves, for example, IP version 4, directs further processing by the network sequencer 542, which also looks at the protocol type located ten bytes into the IP header for an indication of the transport header protocol of the packet. For example, for IP over Ethernet, the IP header begins at offset 14, and the protocol type byte is offset 23, which will be processed by network logic to determine whether the transport layer protocol is TCP, for example. From the length of the network layer header, which is typically 20–40 bytes, network sequencer 542 determines the beginning of the packet's transport layer header for validating the transport layer header. Transport sequencer 546 may generate checksums for the transport layer header and data, which may include information from the IP header in the case of TCP at least.

Continuing with the example of a TCP packet, transport sequencer 546 also analyzes the first few bytes in the transport layer portion of the header to determine, in part, the TCP source and destination ports for the message, such as whether the packet is NetBios or other protocols. Byte 12 of the TCP header is processed by the transport sequencer 546 to determine and validate the TCP header length. Byte 13 of the TCP header contains flags that may, aside from ack flags and push flags, indicate unexpected options, such as reset and fin, that may cause the processor to categorize this packet as an exception. TCP offset bytes 16 and 17 are the checksum, which is pulled out and stored by the hardware logic while the rest of the frame is validated against the checksum.

Session sequencer 548 determines the length of the session layer header, which in the case of NetBios is only four bytes, two of which tell the length of the NetBios payload data, but which can be much larger for other protocols. The session sequencer 548 can also be used, for example, to categorize the type of message as a read or write, for which the fast-path may be particularly beneficial. Further upper layer logic processing, depending upon the message type, can be performed by the hardware logic of packet control sequencer 510 and fly-by sequencer 502. Thus the sequencers 52 intelligently directs hardware processing of the headers by categorization of selected bytes from a single stream of bytes, with the status of the packet being built from classifications determined on the fly. Once the packet control sequencer 510 detects that all of the packet has been processed by the fly-by sequencer 502, the packet control sequencer 510 adds the status information generated by the fly-by sequencer 502 and any status information generated by the packet control sequencer 510, and prepends (adds to the front) that status information to the packet, for convenience in handling the packet by the processor 44. The additional status information generated by the packet control sequencer 510 includes media access controller 60 status information and any errors discovered, or data overflow in either the assembly register or DRAM buffer, or other miscellaneous information regarding the packet. The packet control sequencer 510 also stores entries into a receive buffer queue and a receive statistics queue via the queue manager 520.

An advantage of processing a packet by hardware logic is that the packet does not, in contrast with conventional sequential software protocol processing, have to be stored, moved, copied or pulled from storage for processing each protocol layer header, offering dramatic increases in processing efficiency and savings in processing time for each packet. The packets can be processed at the rate bits are received from the network, for example 100 megabits/second for a 100 baseT connection. The time for categorizing a packet received at this rate and having a length of sixty bytes is thus about 5 microseconds. The total time for processing this packet with the hardware logic and sending packet data to its host destination via the fast-path may be an order of magnitude less than that required by a conventional CPU employing conventional sequential software protocol processing, without even considering the additional time savings afforded by the reduction in CPU interrupts and host bus bandwidth savings. For the case in which the destination resides in the INIC cache, additional bandwidth savings for host bus 35 and I/O bus 40 are achieved.

The processor 44 chooses, for each received message packet held in frame buffers 77, whether that packet is a candidate for the fast-path and, if so, checks to see whether a fast-path has already been set up for the connection to which the packet belongs. To do this, the processor 44 first checks the header status summary to determine whether the packet headers are of a protocol defined for fast-path candidates. If not, the processor 44 commands DMA controllers in the INIC 22 to send the packet to the host for slow-path processing. Even for a slow-path processing of a message, the INIC 22 thus performs initial procedures such as validation and determination of message type, and passes the validated message at least to the data link layer of the host.

For fast-path candidates, the processor 44 checks to see whether the header status summary matches a CCB held by the INIC. If so, the data from the packet is sent along the fast-path to the destination 168 in the host. If the fast-path candidate's packet summary does not match a CCB held by the INIC, the packet may be sent to the host for slow-path processing to create a CCB for the message. The fast-path may also not be employed for the case of fragmented messages or other complexities. For the vast majority of messages, however, the INIC fast-path can greatly accelerate message processing. The INIC 22 thus provides a single state machine processor 44 that decides whether to send data directly to its destination, based upon information gleaned on the fly, as opposed to the conventional employment of a state machine in each of several protocol layers for determining the destiny of a given packet.

Caching the CCBs in a hash table in the INIC provides quick comparisons with words summarizing incoming packets to determine whether the packets can be processed via the fast-path, while the full CCBs are also held in the INIC for processing. Other ways to accelerate this comparison include software processes such as a B-tree or hardware assists such as a content addressable memory (CAM). When INIC microcode or comparator circuits detect a match with the CCB, a DMA controller places the data from the packet in the destination in host memory 33 or INIC File cache 80, without any interrupt by the CPU, protocol processing or copying. Depending upon the type of message received, the destination of the data may be the session, presentation or application layers in the host 20, or host file cache 24 or INIC file cache 80.

One of the most commonly used network protocols for large messages such as file transfers is server message block (SMB) over TCP/IP. SMB can operate in conjunction with redirector software that determines whether a required resource for a particular operation, such as a printer or a disk upon which a file is to be written, resides in or is associated with the host from which the operation was generated or is located at another host connected to the network, such as a file server. SMB and server/redirector are conventionally serviced by the transport layer; in the present invention SMB and redirector can instead be serviced by the INIC. In this case, sending data by the DMA controllers from the INIC buffers when receiving a large SMB transaction may greatly reduce interrupts that the host must handle. Moreover, this DMA generally moves the data to its destination in the host file cache 24 or INIC file cache 80, from which it is then flushed in blocks to the host storage unit 66 or INIC storage unit 70, respectively.

An SMB fast-path transmission generally reverses the above described SMB fast-path receive, with blocks of data read from the host storage unit 66 or INIC storage unit 70 to the host file cache 24 or INIC file cache 80, respectively, while the associated protocol headers are prepended to the data by the INIC, for transmission via a network line to a remote host. Processing by the INIC of the multiple packets and multiple TCP, IP, NetBios and SMB protocol layers via custom hardware and without repeated interrupts of the host can greatly increase the speed of transmitting an SMB message to a network line. As noted above with regard to FIG. 4, for the case in which the transmitted file blocks are stored on INIC storage unit 70, additional savings in host bus 35 bandwidth and I/O bus bandwidth 40 can be achieved.

Figure 12:
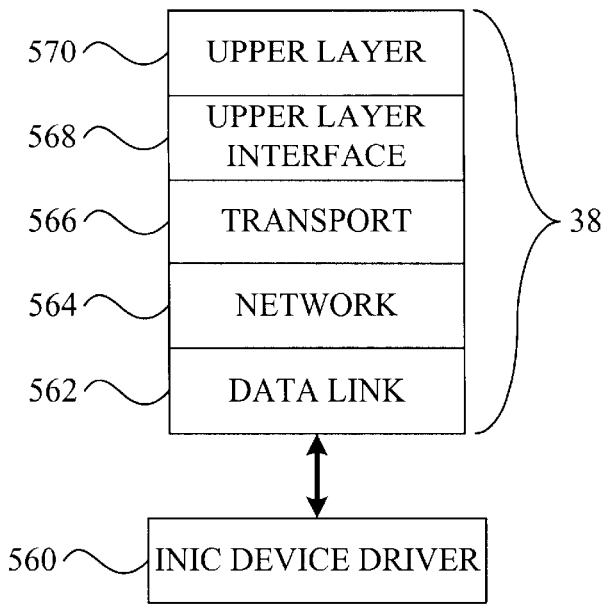
FIG. 12 is a diagram of the specialized host protocol stack of FIG. 1 for creating and controlling a communication control block for the fast-path as well as for processing packets in the slow path.

FIG. 12 shows the Alacritech protocol stack 38 employed by the host in conjunction with INIC, neither of which are shown in this figure, for processing network messages. An INIC device driver 560 links the INIC to the operating system of the host, and can pass communications between the INIC and the protocol stack 38. The protocol stack 38 in this embodiment includes data link layer 562, network layer 564, transport layer 566, upper layer interface 568 and upper layer 570. The upper layer 570 may represent a session, presentation and/or application layer, depending upon the particular protocol employed and message communicated. The protocol stack 38 processes packet headers in the slow-path, creates and tears down connections, hands out CCBs for fast-path connections to the INIC, and receives CCBs for fast-path connections being flushed from the INIC to the host 20. The upper layer interface 568 is generally responsible for assembling CCBs based upon connection and status information created by the data link layer 562, network layer 564 and transport layer 566, and handing out the CCBs to the INIC via the INIC device driver 560, or receiving flushed CCBs from the INIC via the INIC device driver 560.

Figure 13:
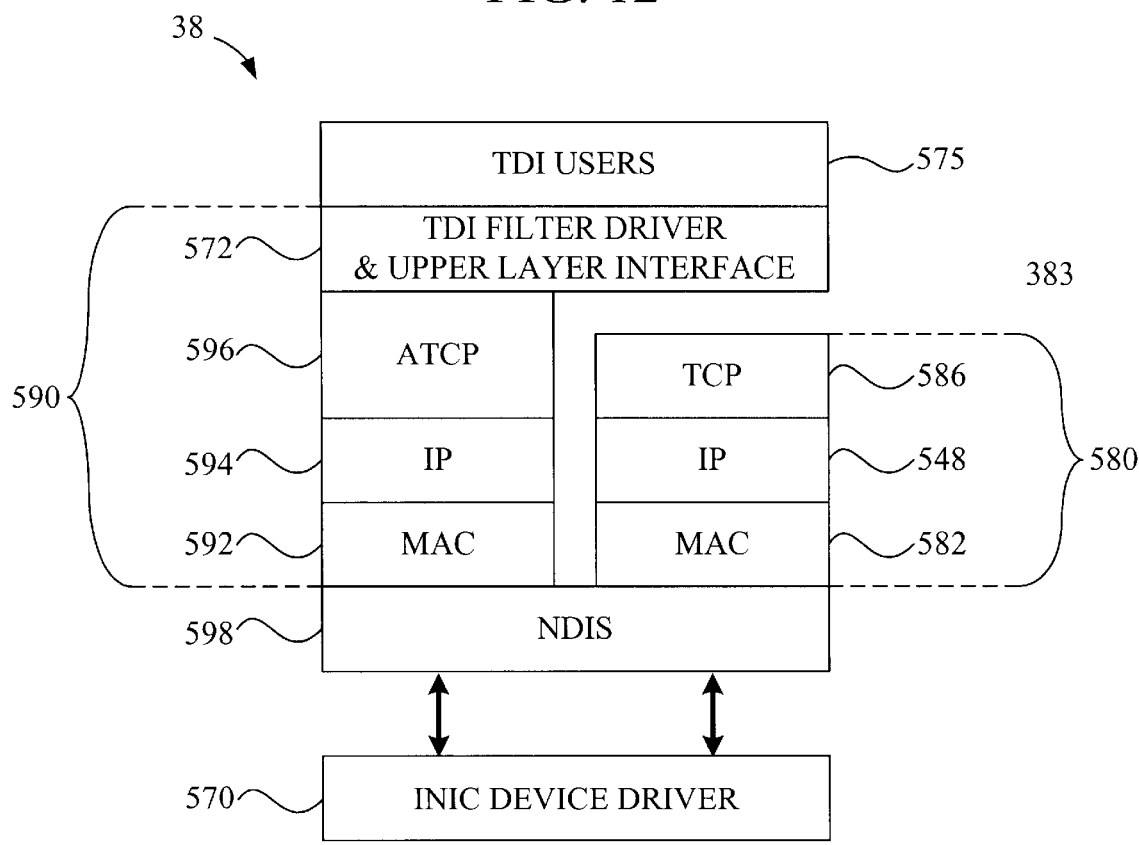
FIG. 13 is a diagram of a Microsoft® TCP/IP stack and Alacritech command driver configured for NetBios communications.

FIG. 13 shows another embodiment of the Alacritech protocol stack 38 that includes plural protocol stacks for processing network communications in conjunction with a Microsoft® operating system. A conventional Microsoft® TCP/IP protocol stack 580 includes MAC layer 582, IP layer 584 and TCP layer 586. A command driver 590 works in concert with the host stack 580 to process network messages. The command driver 590 includes a MAC layer 592, an IP layer 594 and an Alacritech TCP (ATCP) layer 596. The conventional stack 580 and command driver 590 share a network driver interface specification (NDIS) layer 598, which interacts with an INIC device driver 570. The INIC device driver 570 sorts receive indications for processing by either the conventional host stack 580 or the ATCP driver 590. A TDI filter driver and upper layer interface 572 similarly determines whether messages sent from a TDI user 575 to the network are diverted to the command driver and perhaps to the fast-path of the INIC, or processed by the host stack.

Figure 14:
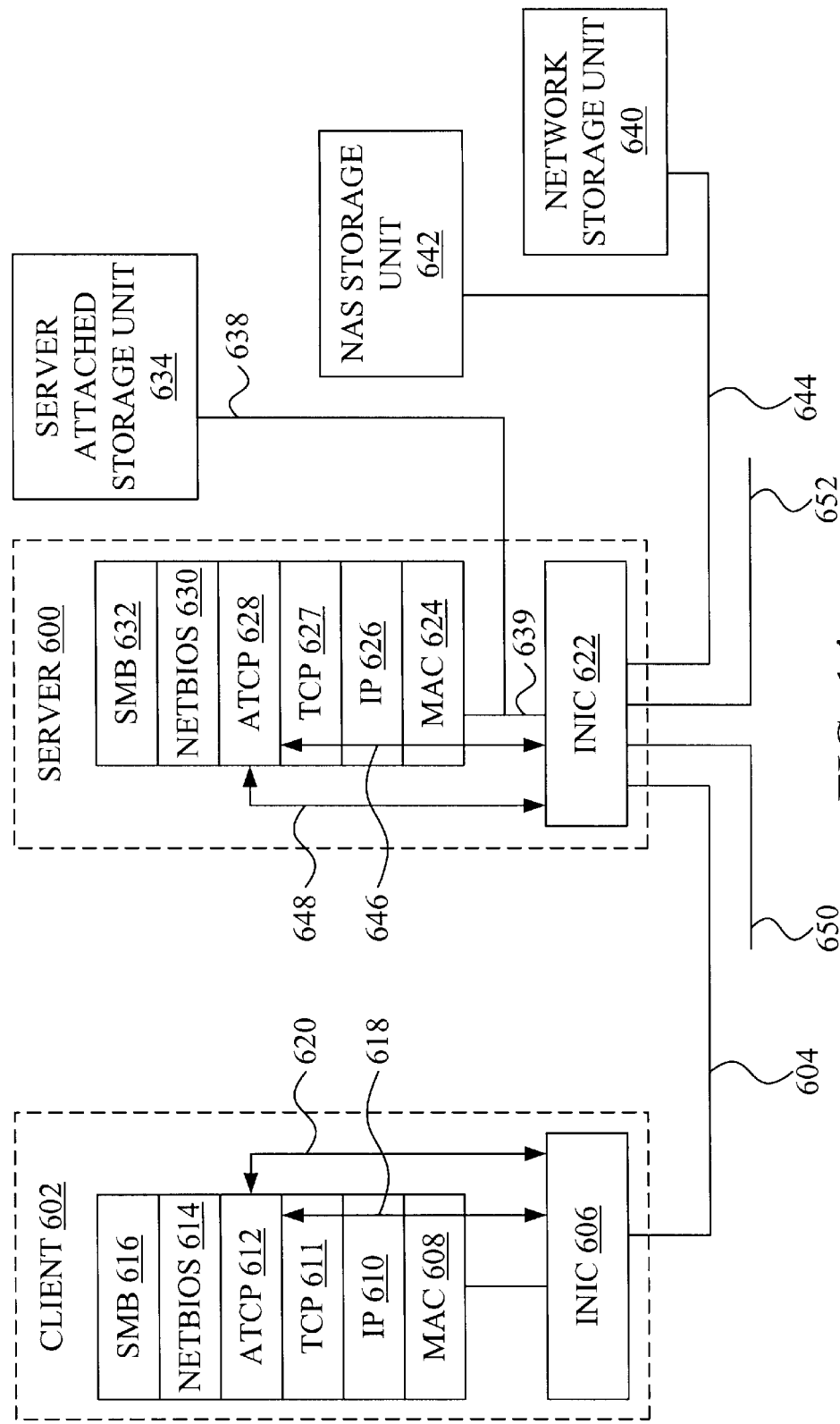
FIG. 14 is a diagram of a NetBios communication exchange between a client and server having a network storage unit.

FIG. 14 depicts an SMB exchange between a server 600 and client 602, both of which have INICs, each INIC holding a CCB defining its connection and status for fast-path movement of data over network 604, which may be Gigabit Ethernet compliant. The client 602 includes INIC 606, 802.3 compliant data link layer 608, IP layer 610, TCP layer 611, ATCP layer 612, NetBios layer 614, and SMB layer 616. The client has a slow-path 618 and fast-path 620 for communication processing. Similarly, the server 600 includes INIC 622, 802.3 compliant data link layer 624, IP layer 626, TCP layer 627, ATCP layer 628, NetBios layer 630, and SMB layer 632. A server attached storage unit 634 is connected to the server 600 over a parallel channel 638 such as a SCSI channel, which is connected to an I/O bus 639 that is also connected to INIC 622. A network storage unit 640 is connected to INIC 622 over network line 644, and a NAS storage unit 642 is attached to the same network 644, which may be Gigabit Ethernet compliant. Server 600 has a slow-path 646 and fast-path 648 for communication processing that travels over the I/O bus 638 between INIC 622 and a file cache, not shown in this figure.

A storage fast-path is provided by the INIC 622, under control of the server, for data transferred between network storage units 640 or 642 and client 602 that does not cross the I/O bus. Data is communicated between INIC 622 and network storage unit 640 in accordance with a block format, such as SCSI/TCP or ISCSI, whereas data is communicated between INIC 622 and NAS storage unit 642 in accordance with a file format, such as TCP/NetBios/SMB. For either storage fast-path the INIC 622 may hold another CCB defining a connection with storage unit 640 or 642. For convenience in the following discussion, the CCB held by INIC 606 defining its connection over network 604 with server 600 is termed the client CCB, the CCB held by INIC 622 defining its connection over network 604 with client 602 is termed the server CCB. A CCB held by INIC 622 defining its connection over network 644 with network storage unit 640 is termed the SAN CCB, and a CCB held by INIC 622 defining its connection over network 644 with NAS storage unit 642 is termed the NAS CCB. Additional network lines 650 and 652 may be connected to other communication and/or storage networks.

Assuming that the client 602 wishes to read a 100 KB file on the server 600 that is stored in blocks on network storage unit 640, the client may begin by sending a SMB read request across network 604 requesting the first 64 KB of that file on the server. The request may be only 76 bytes, for example, and the INIC 622 on the server recognizes the message type (SMB) and relatively small message size, and sends the 76 bytes directly to the ATCP filter layer 628, which delivers the request to NetBios 630 of the server. NetBios 630 passes the session headers to SMB 632, which processes the read request and determines whether the requested data is held on a host or INIC file cache. If the requested data is not held by the file caches, SMB issues a read request to the file system to read the data from the network storage unit 640 into the INIC 622 file cache.

To perform this read, the file system instructs INIC 622 to fetch the 64 KB of data from network storage unit 640 into the INIC 622 file cache. The INIC 622 then sends a request for the data over network 644 to network storage unit 640. The request may take the form of one or more SCSI commands to the storage unit 640 to read the blocks, with the commands attached to TCP/IP headers, according to ISCSI or similar protocols. A controller on the storage unit 640 responds to the commands by reading the requested blocks from its disk drive or drives, adding ISCSI or similar protocol headers to the blocks or frame-sized portions of the blocks, and sending the resulting frames over network 644 to INIC 622. The frames are received by the INIC 622, processed by the INIC 622 sequencers, matched with the storage CCB, and reassembled as a 64 KB file stream in the INIC file cache that forms part of the requested 100 KB file. Once the file stream is stored on INIC 622 file cache, SMB constructs a read reply and sends a scatter-gather list denoting that file stream to INIC 622, and passes the reply to the INIC 622 to send the data over the network according to the server CCB. The INIC 622 employs the scatter-gather list to read data packets from its file cache, which are prepended with IP/TCP/NetBios/SMB headers created by the INIC based on the server CCB, and sends the resulting frames onto network 604. The remaining 36KB of the file is sent by similar means. In this manner a file on a network storage unit may be transferred under control of the server without any of the data from the file encountering the I/O bus or server protocol stack.

For the situation in which the data requested by client 602 is stored on NAS storage unit 642, the request may be forwarded from server 600 to that storage unit 642, which replies by sending the data with headers addressed to client 602, with server 600 serving as a router. For an embodiment in which server 600 is implemented as a proxy server or as a web cache server, the data from NAS storage unit 642 may instead be sent to server 600, which stores the data in its file cache to offer quicker response to future requests for that data. In this implementation, the file system on server 600 directs INIC 622 to request the file data on NAS storage unit 642, which responds by sending a number of approximately 1.5 KB packets containing the first 64 KB of file data. The packets containing the file data are received by INIC 622, categorized by INIC receive sequencer and matched with the NAS CCB, and a session layer header from an initial packet is processed by the host stack, which obtains from the file system a scatter-gather list of addresses in INIC 622 file cache to store the data from the packets. The scatter-gather list is sent by the host stack to the INIC 622 and stored with the NAS CCB, and the INIC 622 begins to DMA data from any accumulated packets and subsequent packets corresponding to the NAS CCB into the INIC 622 file cache as a file stream according to the scatter-gather list. The host file system then directs the INIC 622 to create headers based on the client CCB and prepend the headers to packets of data read from the file stream, for sending the data to client 602. The remaining 36 KB of the file is sent by similar means, and may be cached in the INIC 622 file cache as another file stream. With the file streams maintained in the INIC 622 file cache, subsequent requests for the file from clients such as client 606 may be processed more quickly.

For the situation in which the file requested by client 602 was not present in a cache, but instead stored as file blocks on the server attached storage unit 634, the server 622 file system instructs a host SCSI driver to fetch the 100 KB of data from server attached storage unit 634 into the server 600 file cache (assuming the file system does not wish to cache the data on INIC 622 file cache). The host SCSI driver then sends a SCSI request for the data over SCSI channel 638 to server attached storage unit 634. A controller on the server attached storage unit 634 responds to the commands by reading the requested blocks from its disk drive or drives and sending the blocks over SCSI channel 639 to the SCSI driver, which interacts with the cache manager under direction of the file system to store the blocks as file streams in the server 600 file cache. A file system redirector then directs SMB to send a scatter-gather list of the file streams to INIC 622, which is used by the INIC 622 to read data packets from the server 600 file streams. The INIC 622 prepends the data packets with headers it created based on the server CCB, and sends the resulting frames onto network 604.

With INIC 606 operating on the client 602 when this reply arrives, the INIC 606 recognizes from the first frame received that this connection is receiving fast-path 620 processing (TCP/IP, NetBios, matching a CCB), and the SMB 616 may use this first frame to acquire buffer space for the message. The allocation of buffers can be provided by passing the first 192 bytes of the of the frame, including any NetBios/SMB headers, via the ATCP fast-path 620 directly to the client NetBios 614 to give NetBios/SMB the appropriate headers. NetBios/SMB will analyze these headers, realize by matching with a request ID that this is a reply to the original Read connection, and give the ATCP command driver a 64K list of buffers in a client file cache into which to place the data. At this stage only one frame has arrived, although more may arrive while this processing is occurring. As soon as the client buffer list is given to the ATCP command driver 628, it passes that transfer information to the INIC 606, and the INIC 606 starts sending any frame data that has accumulated into those buffers by DMA.

Should the client 602 wish to write an SMB file to a server 600, a write request is sent over network 604, which may be matched with a CCB held by INIC 622. Session layer headers from an initial packet of the file write are processed by server SMB 632 to allocate buffers in the server 600 or INIC 622 file cache, with a scatter-gather list of addresses for those buffers passed back to INIC 622, assuming fast-path processing is appropriate. Packets containing SMB file data are received by INIC 622, categorized by INIC receive sequencer and placed in a queue. The INIC 622 processor recognizes that the packets correspond to the server CCB and DMAs the data from the packets into the INIC 622 or server 600 file cache buffers according to the scatter-gather list to form a file stream.

The file system then orchestrates sending the file stream to server storage unit 634, network storage unit 640 or NAS storage unit 642. To send the file stream to server storage unit 634, the file system commands a SCSI driver in the server 600 to send the file stream as file blocks to the storage unit 634. To send the file stream to network storage unit 640, the file system directs the INIC to create ISCSI or similar headers based on the SAN CCB, and prepend those headers to packets read from the file stream according to the scatter-gather list, sending the resulting frames over network 644 to storage unit 640. To send the file stream to NAS storage unit 642, which may for example be useful in distributed file cache or proxy server implementations, the file system redirector prepends appropriate NetBios/SMB headers and directs the INIC to create IP/TCP headers based on the NAS CCB, and prepend those headers to packets read from the file stream according to the scatter-gather list, sending the resulting frames over network 644 to storage unit 642.

Figure 15:
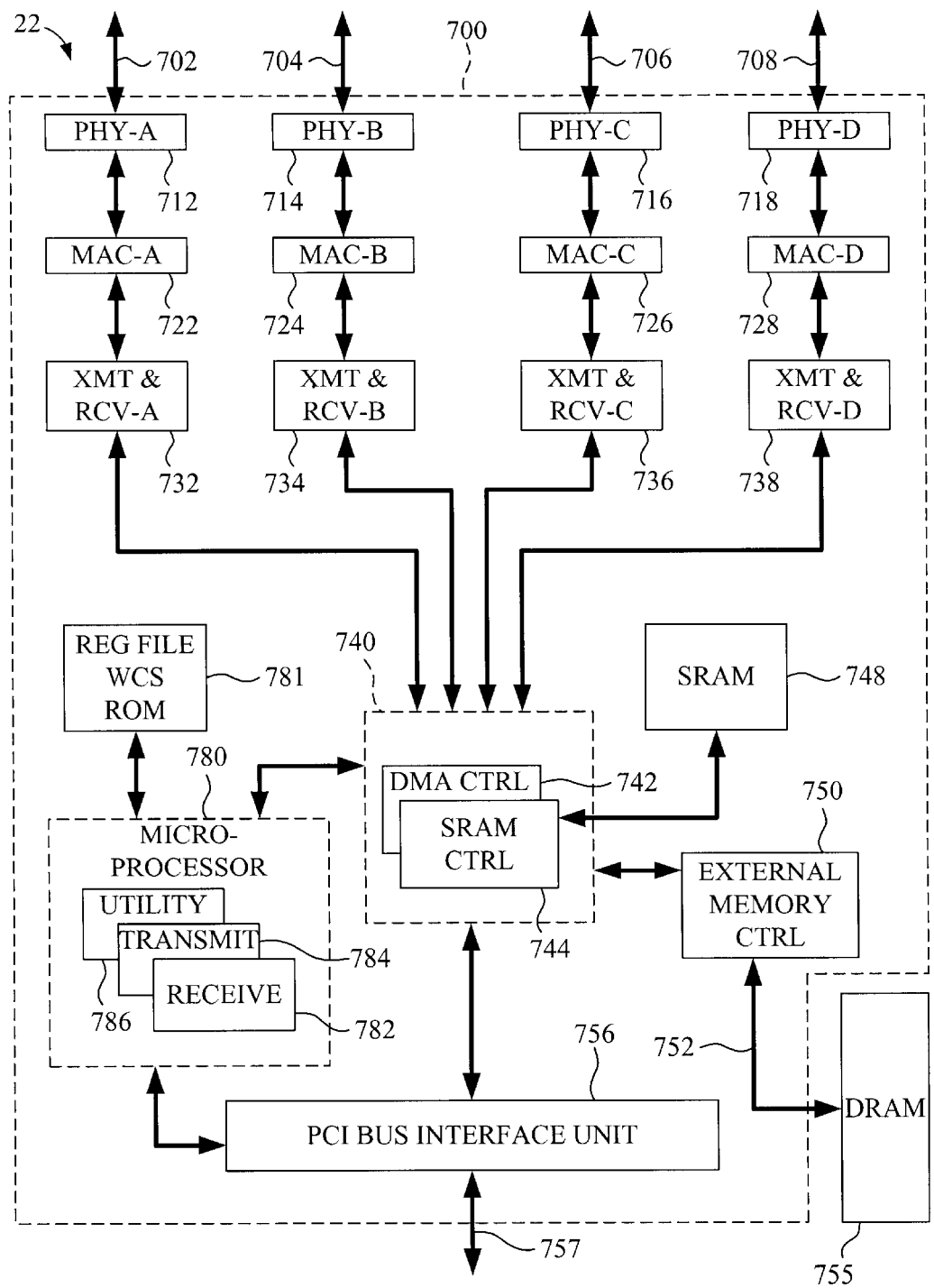
FIG. 15 is a diagram of hardware functions included in the INIC of FIG. 1.

FIG. 15 provides a diagram of the INIC 22, which combines the functions of a network interface, storage controller and protocol processor in a single ASIC chip 700. The INIC 22 in this embodiment offers a full-duplex, four channel, 10/100-Megabit per second (Mbps) intelligent network interface controller that is designed for high speed protocol processing for server and network storage applications. The INIC 22 can also be connected to personal computers, workstations, routers or other hosts anywhere that TCP/IP, TTCP/IP or SPX/IPX protocols are being utilized. Description of such an INIC is also provided in U.S. Patent Application Serial No. 60/061,809, filed Oct. 14, 1997, U.S. patent application Ser. No. 09/067,544, filed Apr. 27, 1998, U.S. Patent Application Serial No. 60/098,296, filed Aug. 27, 1998, U.S. patent application Ser. No. 09/141, 713, filed Aug. 28, 1998, and, U.S. patent application Ser. No. 09/384,792, filed Aug. 27, 1999, which are incorporated by reference herein. Also incorporated by reference herein is the U.S. Patent Application entitled "Intelligent Network Storage Interface Device", filed on even date herewith by Express Mail No. EK532538259 and having the same inventors as the present application.

The INIC 22 is connected by network connectors to four network lines 702, 704, 706 and 708, which may transport data along a number of different conduits, such as twisted pair, coaxial cable or optical fiber, each of the connections providing a media independent interface (MII) via commercially available physical layer chips 712, 714, 716 and 718, such as model 80220/80221 Ethernet Media Interface Adapter from SEEQ Technology Incorporated, 47200 Bayside Parkway, Fremont, Calif. 94538. The lines preferably are 802.3 compliant and in connection with the INIC constitute four complete Ethernet nodes, the INIC supporting 10Base-T, 10Base-T2, 100Base-TX, 100Base-FX and 100Base-T4 as well as future interface standards. Physical layer identification and initialization is accomplished through host driver initialization routines. The connection between the network lines 702, 704, 706 and 708, and the INIC 22 is controlled by MAC units MAC-A 722, MAC-B 724, MAC-C 726 and MAC-D 728 which contain logic circuits for performing the basic functions of the MAC sublayer, essentially controlling when the INIC accesses the network lines 702, 704, 706 and 708. The MAC units 722, 724, 726 and 728 may act in promiscuous, multicast or unicast modes, allowing the INIC to function as a network monitor, receive broadcast and multicast packets and implement multiple MAC addresses for each node. The MAC units 722, 724, 726 and 728 also provide statistical information that can be used for simple network management protocol (SNMP).

The MAC units 722, 724, 726 and 728 are each connected to transmit and receive sequencers, XMT & RCV-A 732, XMT & RCV-B 734, XMT & RCV-C 736 and XMT & RCV-D 738. Each of the transmit and receive sequencers can perform several protocol processing steps on the fly as message frames pass through that sequencer. In combination with the MAC units, the transmit and receive sequencers 732, 734, 736 and 738 can compile the packet status for the data link, network, transport, session and, if appropriate, presentation and application layer protocols in hardware, greatly reducing the time for such protocol processing compared to conventional sequential software engines. The transmit and receive sequencers 732, 734, 736 and 738 are connected to an SRAM and DMA controller 740, which includes DMA controllers 742 and SRAM controller 744, which controls static random access memory (SRAM) buffers 748. The SRAM and DMA controllers 740 interact with external memory control 750 to send and receive frames via external memory bus 752 to and from dynamic random access memory (DRAM) buffers 755, which is located adjacent to the IC chip 700. The DRAM buffers 755 may be configured as 4 MB, 8 MB, 16 MB or 32 MB, and may optionally be disposed on the chip. The SRAM and DMA controllers 740 are connected to an I/O bridge that in this case is a PCI Bus Interface Unit (BIU) 756, which manages the interface between the INIC 22 and the PCI interface bus 757. The 64-bit, multiplexed BIU 756 provides a direct interface to the PCI bus 757 for both slave and master functions. The INIC 22 is capable of operating in either a 64-bit or 32-bit PCI environment, while supporting 64-bit addressing in either configuration.

A microprocessor 780 is connected to the SRAM and DMA controllers 740 and to the PCI BIU 756. Microprocessor 780 instructions and register files reside in an on chip control store 781, which includes a writable on-chip control store (WCS) of SRAM and a read only memory (ROM). The microprocessor 780 offers a programmable state machine which is capable of processing incoming frames, processing host commands, directing network traffic and directing PCI bus traffic. Three processors are implemented using shared hardware in a three level pipelined architecture that launches and completes a single instruction for every clock cycle. A receive processor 782 is primarily used for receiving communications while a transmit processor 784 is primarily used for transmitting communications in order to facilitate full duplex communication, while a utility processor 786 offers various functions including overseeing and controlling PCI register access.

Since instructions for processors 782, 784 and 786 reside in the on-chip control-store 781, the functions of the three processors can be easily redefined, so that the microprocessor 780 can be adapted for a given environment. For instance, the amount of processing required for receive functions may outweigh that required for either transmit or utility functions. In this situation, some receive functions may be performed by the transmit processor 784 and/or the utility processor 786. Alternatively, an additional level of pipelining can be created to yield four or more virtual processors instead of three, with the additional level devoted to receive functions.

The INIC 22 in this embodiment can support up to 256 CCBs which are maintained in a table in the DRAM 755. There is also, however, a CCB index in hash order in the SRAM 748 to save sequential searching. Once a hash has been generated, the CCB is cached in SRAM, with up to sixteen cached CCBs in SRAM in this example. Allocation of the sixteen CCBs cached in SRAM is handled by a least recently used register, described below. These cache locations are shared between the transmit 784 and receive 786 processors so that the processor with the heavier load is able to use more cache buffers. There are also eight header buffers and eight command buffers to be shared between the sequencers. A given header or command buffer is not statically linked to a specific CCB buffer, as the link is dynamic on a per-frame basis.

Figure 16:
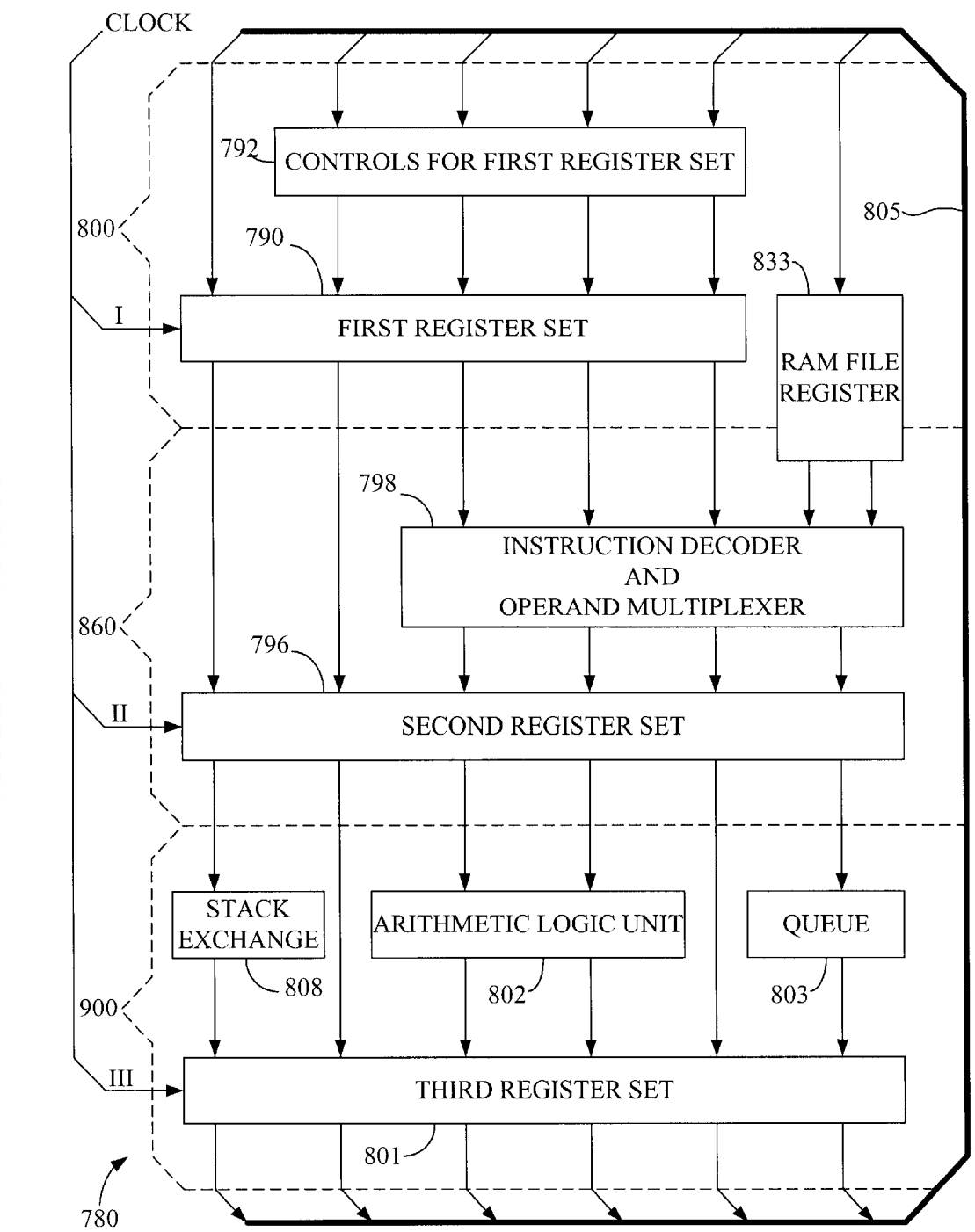
FIG. 16 is a diagram of a trio of pipelined microprocessors included in the INIC of FIG. 15, including three phases with a processor in each phase.

FIG. 16 shows an overview of the pipelined microprocessor 780, in which instructions for the receive, transmit and utility processors are executed in three alternating phases according to Clock increments I, II and III, the phases corresponding to each of the pipeline stages. Each phase is responsible for different functions, and each of the three processors occupies a different phase during each Clock increment. Each processor usually operates upon a different instruction stream from the control store 781, and each carries its own program counter and status through each of the phases.

In general, a first instruction phase 800 of the pipelined microprocessors completes an instruction and stores the result in a destination operand, fetches the next instruction, and stores that next instruction in an instruction register. A first register set 790 provides a number of registers including the instruction register, and a set of controls 792 for the first register set provides the controls for storage to the first register set 790. Some items pass through the first phase without modification by the controls 792, and instead are simply copied into the first register set 790 or a RAM file register 833. A second instruction phase 860 has an instruction decoder and operand multiplexer 798 that generally decodes the instruction that was stored in the instruction register of the first register set 490 and gathers any operands which have been generated, which are then stored in a decode register of a second register set 796. The first register set 790, second register set 796 and a third register set 801, which is employed in a third instruction phase 900, include many of the same registers, as will be seen in the more detailed views of FIGS. 17A–C. The instruction decoder and operand multiplexer 798 can read from two address and data ports of the RAM file register 833, which operates in both the first phase 800 and second phase 860. A third phase 900 of the processor 780 has an arithmetic logic unit (ALU) 902 which generally performs any ALU operations on the operands from the second register set, storing the results in a results register included in the third register set 801. A stack exchange 808 can reorder register stacks, and a queue manager 803 can arrange queues for the processor 780, the results of which are stored in the third register set.

The instructions continue with the first phase then following the third phase, as depicted by a circular pipeline 805. Note that various functions have been distributed across the three phases of the instruction execution in order to minimize the combinatorial delays within any given phase. With a frequency in this embodiment of 66 MHz, each Clock increment takes 15 nanoseconds to complete, for a total of 45 nanoseconds to complete one instruction for each of the three processors. The rotating instruction phases are depicted in more detail in FIG. 17A–C, in which each phase is shown in a different figure.

Figure 17A:
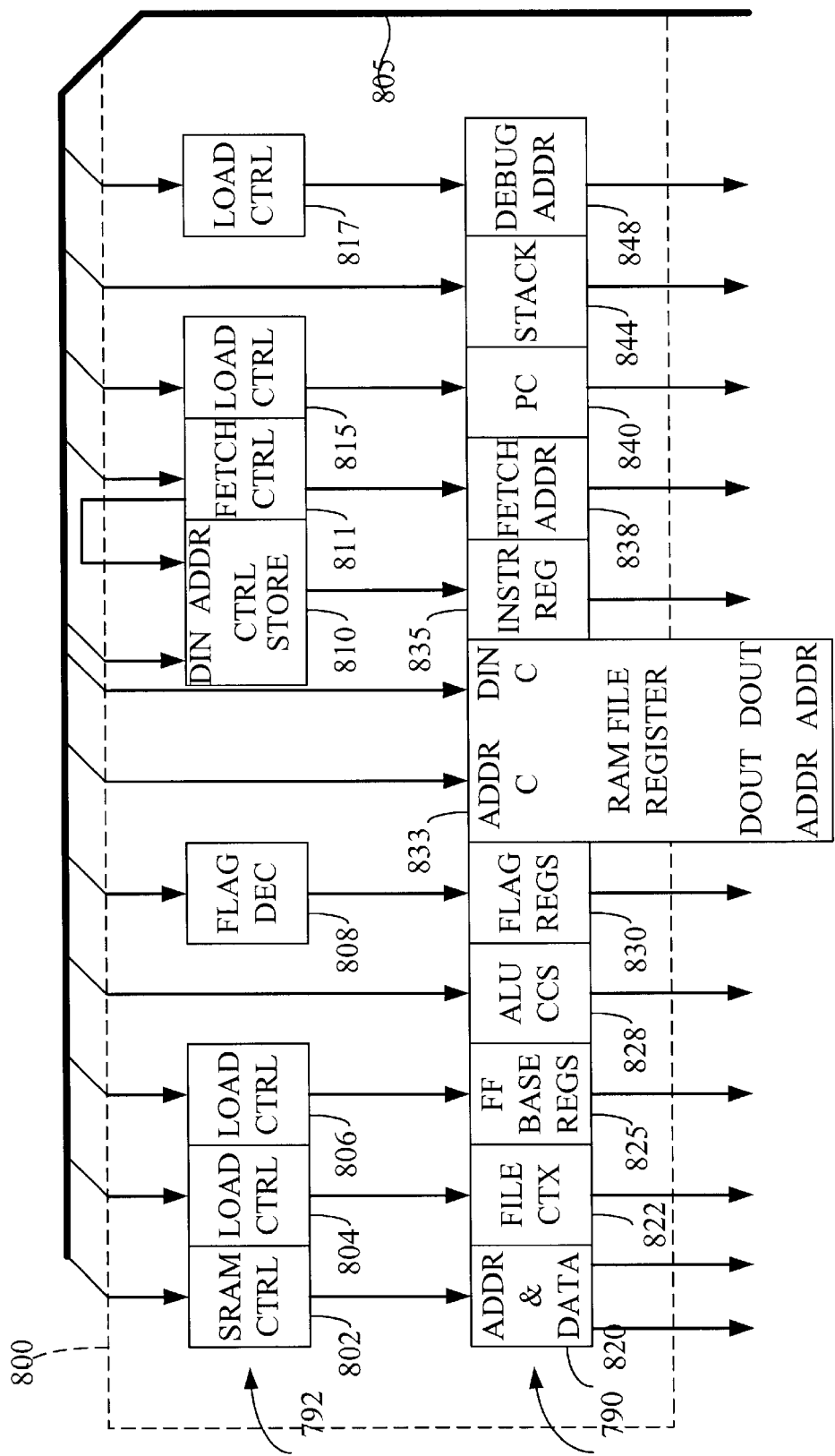
FIG. 17A is a diagram of a first phase of the pipelined microprocessor of FIG. 16.

More particularly, FIG. 17A shows some specific hardware functions of the first phase 800, which generally includes the first register set 790 and related controls 792. The controls for the first register set 792 includes an SRAM control 802, which is a logical control for loading address and write data into SRAM address and data registers 820. Thus the output of the ALU 902 from the third phase 900 may be placed by SRAM control 802 into an address register or data register of SRAM address and data registers 820. A load control 804 similarly provides controls for writing a context for a file to file context register 822, and another load control 806 provides controls for storing a variety of miscellaneous data to flip-flop registers 825. ALU condition codes, such as whether a carried bit is set, get clocked into ALU condition codes register 828 without an operation performed in the first phase 800. Flag decodes 808 can perform various functions, such as setting locks, that get stored in flag registers 830.

The RAM file register 833 has a single write port for addresses and data and two read ports for addresses and data, so that more than one register can be read from at one time. As noted above, the RAM file register 833 essentially straddles the first and second phases, as it is written in the first phase 800 and read from in the second phase 860. A control store instruction 810 allows the reprogramming of the processors due to new data in from the control store 781, not shown in this figure, the instructions stored in an instruction register 835. The address for this is generated in a fetch control register 811, which determines which address to fetch, the address stored in fetch address register 838. Load control 815 provides instructions for a program counter 840, which operates much like the fetch address for the control store. A last-in first-out stack 844 of three registers is copied to the first register set without undergoing other operations in this phase. Finally, a load control 817 for a debug address 848 is optionally included, which allows correction of errors that may occur.

Figure 17B:
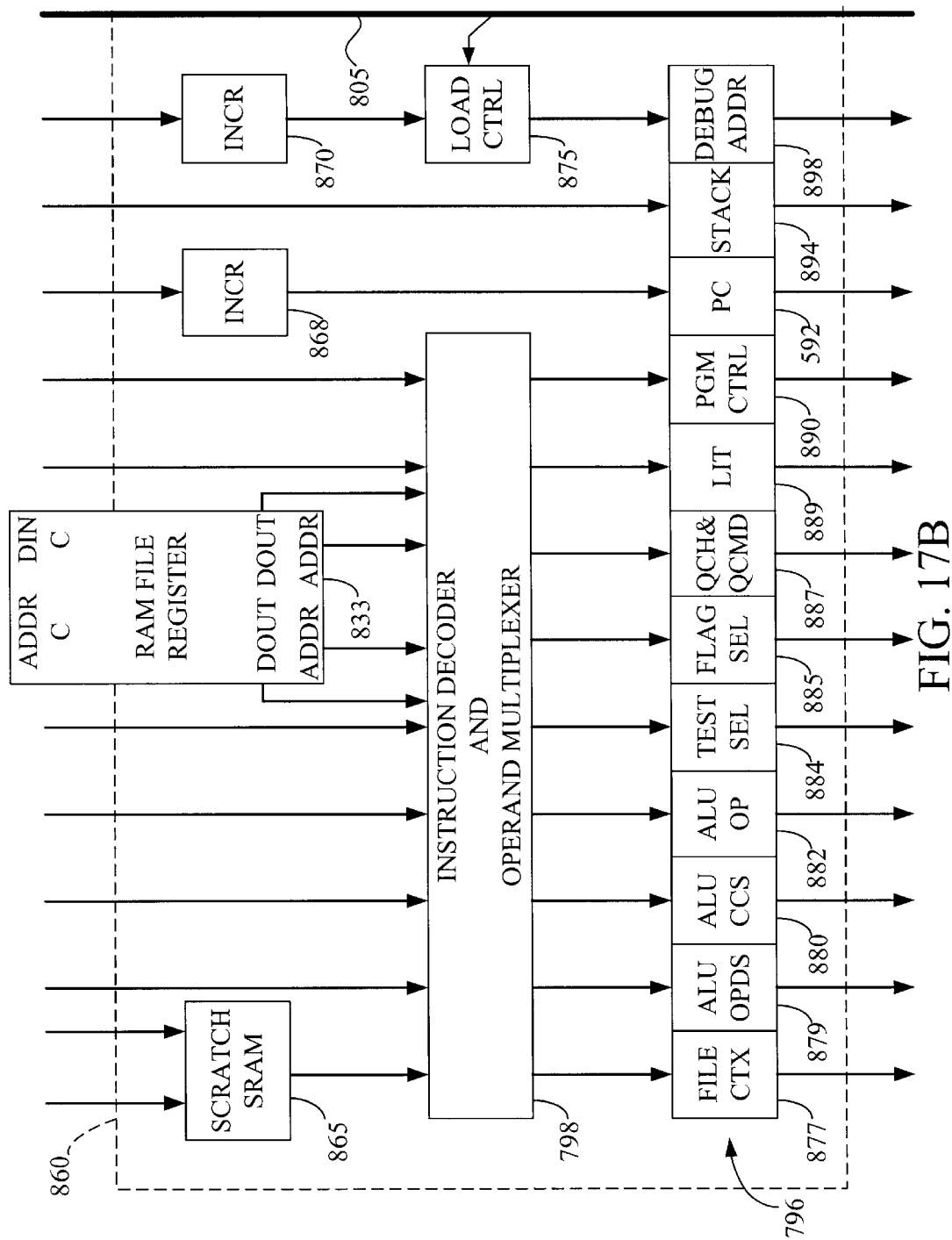
FIG. 17B is a diagram of a second phase of the pipelined microprocessor of FIG. 16.

FIG. 17B depicts the second microprocessor phase 860, which includes reading addresses and data out of the RAM file register 833. A scratch SRAM 865 is written from SRAM address and data register 820 of the first register set, which includes a register that passes through the first two phases to be incremented in the third. The scratch SRAM 865 is read by the instruction decoder and operand multiplexer 798, as are most of the registers from the first register set, with the exception of the stack 844, debug address 848 and SRAM address and data register mentioned above. The instruction decoder and operand multiplexer 798 looks at the various registers of set 790 and SRAM 865, decodes the instructions and gathers the operands for operation in the next phase, in particular determining the operands to provide to the ALU 902 below. The outcome of the instruction decoder and operand multiplexer 798 is stored to a number of registers in the second register set 796, including ALU operands 879 and 882, ALU condition code register 880, and a queue channel and command 887 register, which in this embodiment can control thirty-two queues. Several of the registers in set 796 are loaded fairly directly from the instruction register 835 above without substantial decoding by the decoder 798, including a program control 890, a literal field 889, a test select 884 and a flag select 885. Other registers such as the file context 822 of the first phase 800 are always stored in a file context 877 of the second phase 860, but may also be treated as an operand that is gathered by the multiplexer 872. The stack registers 844 are simply copied in stack register 894. The program counter 840 is incremented 868 in this phase and stored in register 892. Also incremented 870 is the optional debug address 848, and a load control 875 may be fed from the pipeline 805 at this point in order to allow error control in each phase, the result stored in debug address 898.

Figure 17C:
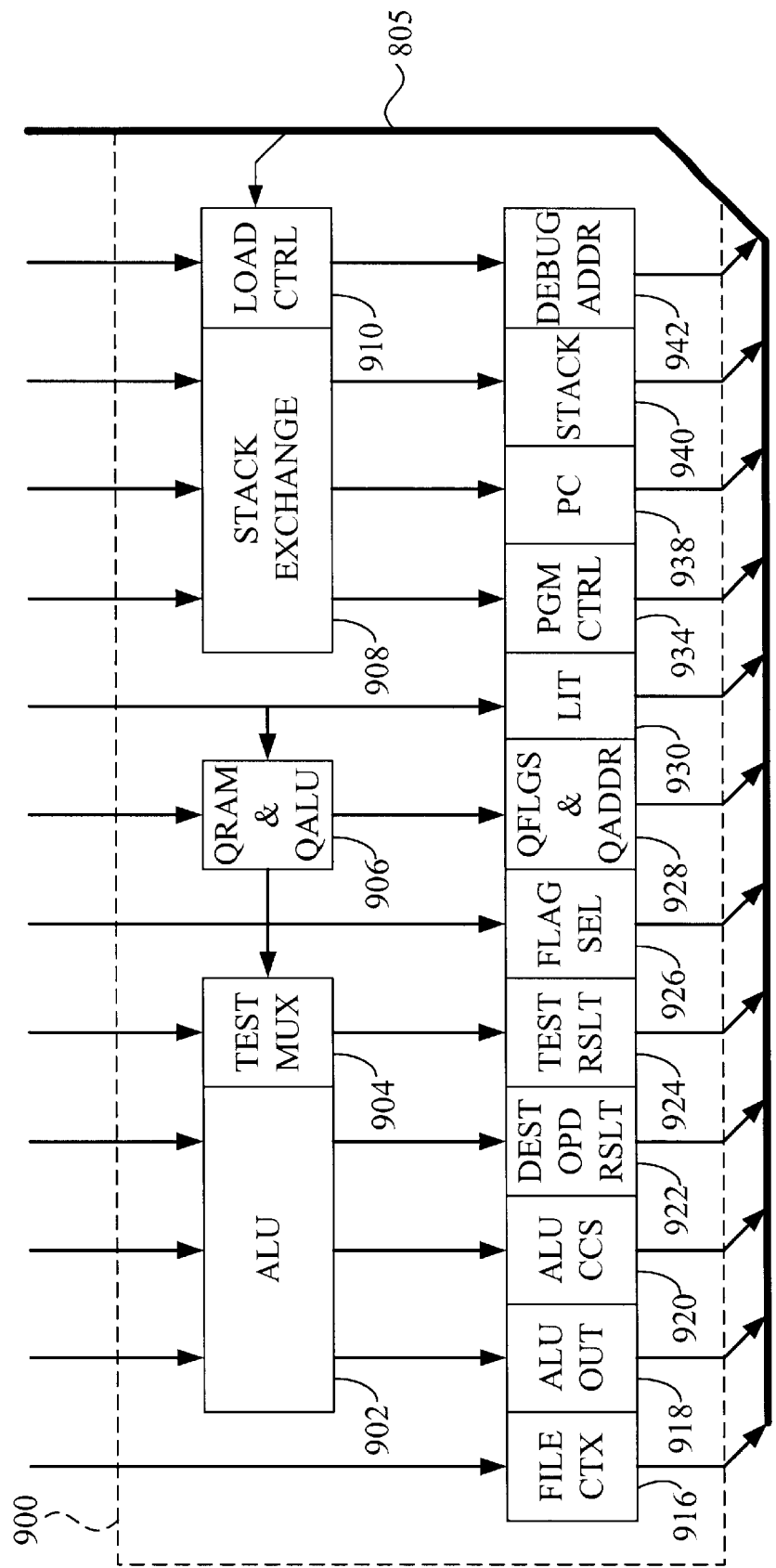
FIG. 17C is a diagram of a third phase of the pipelined microprocessor of FIG. 16.

FIG. 17C depicts the third microprocessor phase 900, which includes ALU and queue operations. The ALU 902 includes an adder, priority encoders and other standard logic functions. Results of the ALU are stored in registers ALU output 918, ALU condition codes 920 and destination operand results 922. A file context register 916, flag select register 926 and literal field register 930 are simply copied from the previous phase 860. A test multiplexer 904 is provided to determine whether a conditional jump results in a jump, with the results stored in a test results register 924. The test multiplexer 904 may instead be performed in the first phase 800 along with similar decisions such as fetch control 811. A stack exchange 808 shifts a stack up or down by fetching a program counter from stack 794 or putting a program counter onto that stack, results of which are stored in program control 934, program counter 938 and stack 940 registers. The SRAM address may optionally be incremented in this phase 900. Another load control 910 for another debug address 942 may be forced from the pipeline 805 at this point in order to allow error control in this phase also. A QRAM & QALU 906, shown together in this figure, read from the queue channel and command register 887, store in SRAM and rearrange queues, adding or removing data and pointers as needed to manage the queues of data, sending results to the test multiplexer 904 and a queue flags and queue address register 928. Thus the QRAM & QALU 906 assume the duties of managing queues for the three processors, a task conventionally performed sequentially by software on a CPU, the queue manager 906 instead providing accelerated and substantially parallel hardware queuing.

Figure 18:
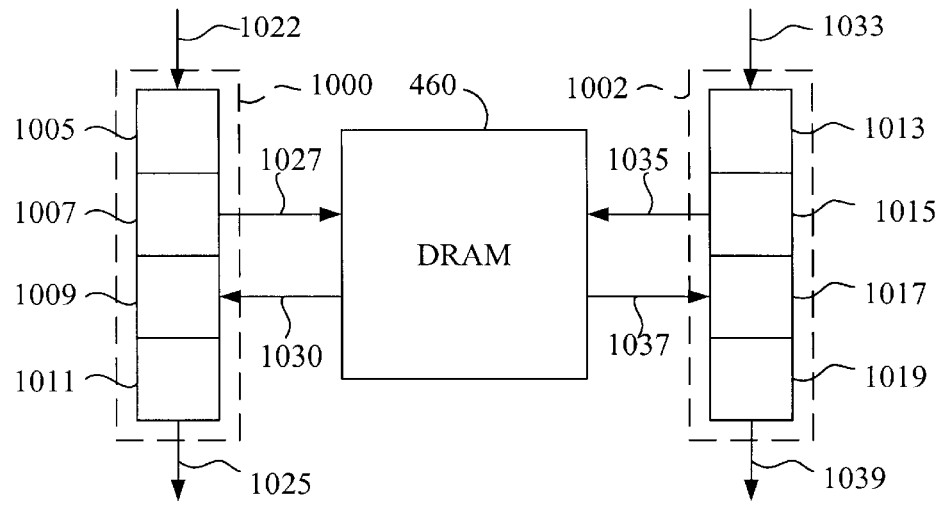
FIG. 18 is a diagram of a plurality of queue storage units that interact with the microprocessor of FIG. 16 and include SRAM and DRAM.

FIG. 18 depicts two of the thirty-two hardware queues that are managed by the queue manager 906, with each of the queues having an SRAM head, an SRAM tail and the ability to queue information in a DRAM body as well, allowing expansion and individual configuration of each queue. Thus FIFO 1000 has SRAM storage units, 1005, 1007, 1009 and 1011, each containing eight bytes for a total of thirty-two bytes, although the number and capacity of these units may vary in other embodiments. Similarly, FIFO 1002 has SRAM storage units 1013, 1015, 1017 and 1019. SRAM units 1005 and 1007 are the head of FIFO 1000 and units 1009 and 1011 are the tail of that FIFO, while units 1013 and 1015 are the head of FIFO 1002 and units 1017 and 1019 are the tail of that FIFO. Information for FIFO 1000 may be written into head units 1005 or 1007, as shown by arrow 1022, and read from tail units 1011 or 1009, as shown by arrow 1025. A particular entry, however, may be both written to and read from head units 1005 or 1007, or may be both written to and read from tail units 1009 or 1011, minimizing data movement and latency. Similarly, information for FIFO 1002 is typically written into head units 1013 or 1015, as shown by arrow 1033, and read from tail units 1017 or 1019, as shown by arrow 1039, but may instead be read from the same head or tail unit to which it was written.

The SRAM FIFOS 1000 and 1002 are both connected to DRAM 755, which allows virtually unlimited expansion of those FIFOS to handle situations in which the SRAM head and tail are full. For example a first of the thirty-two queues, labeled Q-zero, may queue an entry in DRAM 755, as shown by arrow 1027, by DMA units acting under direction of the queue manager, instead of being queued in the head or tail of FIFO 700. Entries stored in DRAM 755 return to SRAM unit 1009, as shown by arrow 1030, extending the length and fall-through time of that FIFO. Diversion from SRAM to DRAM is typically reserved for when the SRAM is full, since DRAM is slower and DMA movement causes additional latency. Thus Q-zero may comprise the entries stored by queue manager 803 in both the FIFO 1000 and the DRAM 755. Likewise, information bound for FIFO 1002, which may correspond to Q-twenty-seven, for example, can be moved by DMA into DRAM 755, as shown by arrow 1035. The capacity for queuing in cost-effective albeit slower DRAM 803 is user-definable during initialization, allowing the queues to change in size as desired. Information queued in DRAM 755 is returned to SRAM unit 1017, as shown by arrow 1037.

Figure 19:
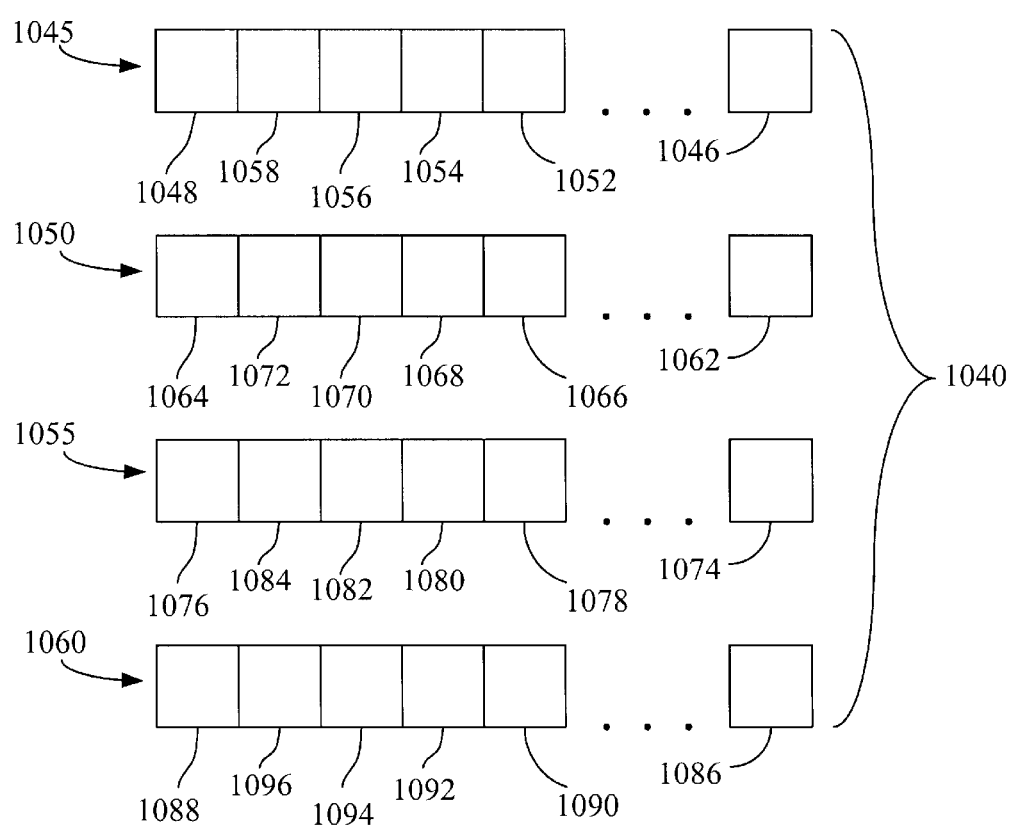
FIG. 19 is a diagram of a set of status registers for the queue storage units of FIG. 18.

Status for each of the thirty-two hardware queues is conveniently maintained in and accessed from a set 1040 of four, thirty-two bit registers, as shown in FIG. 19, in which a specific bit in each register corresponds to a specific queue. The registers are labeled Q-Out_Ready 1045, Q-In_Ready 1050, Q-Empty 1055 and Q-Full 1060. If a particular bit is set in the Q-Out_Ready register 1050, the queue corresponding to that bit contains information that is ready to be read, while the setting of the same bit in the Q-In_Ready 1052 register means that the queue is ready to be written. Similarly, a positive setting of a specific bit in the Q-Empty register 1055 means that the queue corresponding to that bit is empty, while a positive setting of a particular bit in the Q-Full register 1060 means that the queue corresponding to that bit is full. Thus Q-Out_Ready 1045 contains bits zero 1046 through thirty-one 1048, including bits twenty-seven 1052, twenty-eight 1054, twenty-nine 1056 and thirty 1058. Q-In_Ready 1050 contains bits zero 1062 through thirty-one 1064, including bits twenty-seven 1066, twenty-eight 1068, twenty-nine 1070 and thirty 1072. Q-Empty 1055 contains bits zero 1074 through thirty-one 1076, including bits twenty-seven 1078, twenty-eight 1080, twenty-nine 1082 and thirty 1084, and Q-full 1060 contains bits zero 1086 through thirty-one 1088, including bits twenty-seven 1090, twenty-eight 1092, twenty-nine 1094 and thirty 1096.

Q-zero, corresponding to FIFO 1000, is a free buffer queue, which holds a list of addresses for all available buffers. This queue is addressed when the microprocessor or other devices need a free buffer address, and so commonly includes appreciable DRAM 755. Thus a device needing a free buffer address would check with Q-zero to obtain that address. Q-twenty-seven, corresponding to FIFO 1002, is a receive buffer descriptor queue. After processing a received frame by the receive sequencer the sequencer looks to store a descriptor for the frame in Q-twenty-seven. If a location for such a descriptor is immediately available in SRAM, bit twenty-seven 1066 of Q-In_Ready 1050 will be set. If not, the sequencer must wait for the queue manager to initiate a DMA move from SRAM to DRAM, thereby freeing space to store the receive descriptor.

Figure 20:
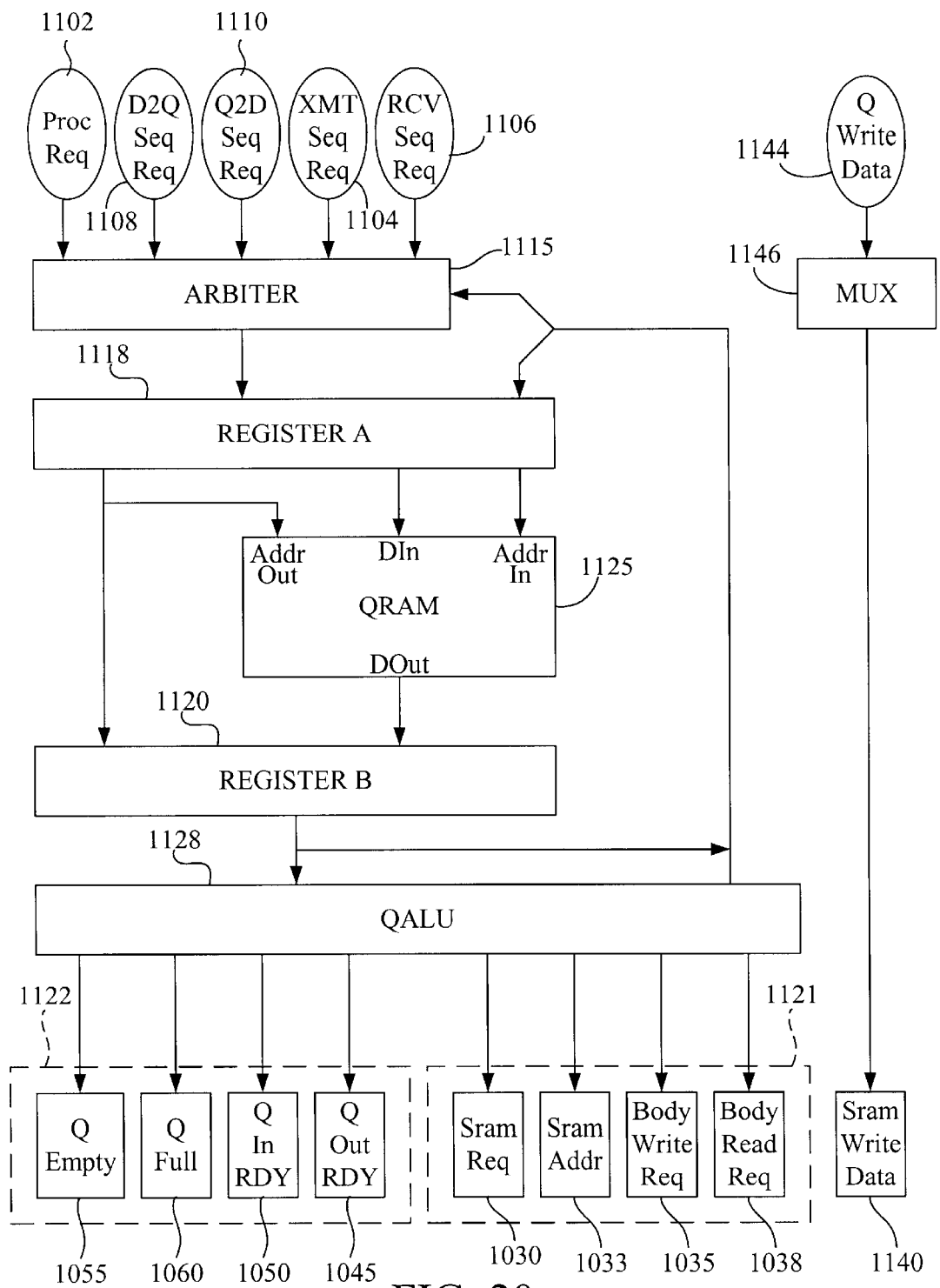
FIG. 20 is a diagram of a queue manager that interacts with the queue storage units and status registers of FIG. 18 and FIG. 19.

Operation of the queue manager, which manages movement of queue entries between SRAM and the processor, the transmit and receive sequencers, and also between SRAM and DRAM, is shown in more detail in FIG. 20. Requests that utilize the queues include Processor Request 1102, Transmit Sequencer Request 1104, and Receive Sequencer Request 1106. Other requests for the queues are DRAM to SRAM Request 1108 and SRAM to DRAM Request 1110, which operate on behalf of the queue manager in moving data back and forth between the DRAM and the SRAM head or tail of the queues. Determining which of these various requests will get to use the queue manager in the next cycle is handled by priority logic Arbiter 1115. To enable high frequency operation the queue manager is pipelined, with Register A 1118 and Register B 1120 providing temporary storage, while Status Register 1122 maintains status until the next update. The queue manager reserves even cycles for DMA, receive and transmit sequencer requests and odd cycles for processor requests. Dual ported QRAM 1125 stores variables regarding each of the queues, the variables for each queue including a Head Write Pointer, Head Read Pointer, Tail Write Pointer and Tail Read Pointer corresponding to the queue's SRAM condition, and a Body Write Pointer and Body Read Pointer corresponding to the queue's DRAM condition and the queue's size.

After Arbiter 1115 has selected the next operation to be performed, the variables of QRAM 825 are fetched and modified according to the selected operation by a QALU 1128, and an SRAM Read Request 1130 or an SRAM Write Request 1140 may be generated. The variables are updated and the updated status is stored in Status Register 1122 as well as QRAM 1125. The status is also fed to Arbiter 1115 to signal that the operation previously requested has been fulfilled, inhibiting duplication of requests. The Status Register 1122 updates the four queue registers Q-Out_Ready 1045, Q-In_Ready 1050, Q-Empty 1055 and Q-Full 1060 to reflect the new status of the queue that was accessed. Similarly updated are SRAM Addresses 1133, Body Write Request 1135 and Body Read Requests 1138, which are accessed via DMA to and from SRAM head and tails for that queue. Alternatively, various processes may wish to write to a queue, as shown by Q Write Data 1144, which are selected by multiplexer 1146, and pipelined to SRAM Write Request 1140. The SRAM controller services the read and write requests by writing the tail or reading the head of the accessed queue and returning an acknowledge. In this manner the various queues are utilized and their status updated. Structure and operation of queue manager 803 is also described in U.S. patent application Ser. No. 09/416,925, entitled "Queue System For Microprocessors", filed Oct. 13, 1999, by Daryl D. Starr and Clive M. Philbrick (the subject matter of which is incorporated herein by reference).

Figure 21A:
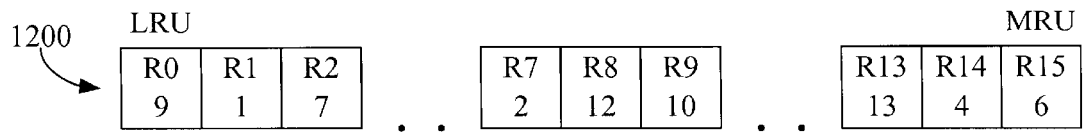
FIGS. 21A–D are diagrams of various stages of a least-recently-used register that is employed for allocating cache memory.
Figure 21B:
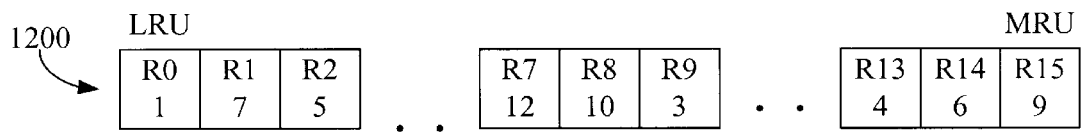

FIGS. 21A–D show a least-recently-used register 1200 that is employed for choosing which contexts or CCBs to maintain in INIC cache memory. The INIC in this embodiment can cache up to sixteen CCBs in SRAM at a given time, and so when a new CCB is cached an old one must often be discarded, the discarded CCB usually chosen according to this register 1200 to be the CCB that has been used least recently. In this embodiment, a hash table for up to two hundred fifty-six CCBs is also maintained in SRAM, while up to two hundred fifty-six full CCBs are held in DRAM. The least-recently-used register 1200 contains sixteen four-bit blocks labeled R0–R15, each of which corresponds to an SRAM cache unit. Upon initialization, the blocks are numbered 0–15, with number 0 arbitrarily stored in the block representing the least recently used (LRU) cache unit and number 15 stored in the block representing the most recently used (MRU) cache unit. FIG. 21A shows the register 1200 at an arbitrary time when the LRU block R0 holds the number 9 and the MRU block R15 holds the number 6. When a different CCB than is currently being held in SRAM is to be cached, the LRU block R0 is read, which in FIG. 21A holds the number 9, and the new CCB is stored in the SRAM cache unit corresponding to number 9. Since the new CCB corresponding to number 9 is now the most recently used CCB, the number 9 is stored in the MRU block, as shown in FIG. 21B. The other numbers are all shifted one register block to the left, leaving the number 1 in the LRU block. The CCB that had previously been cached in the SRAM unit corresponding to number 9 has been moved to slower but more cost-effective DRAM.

Figure 21C:
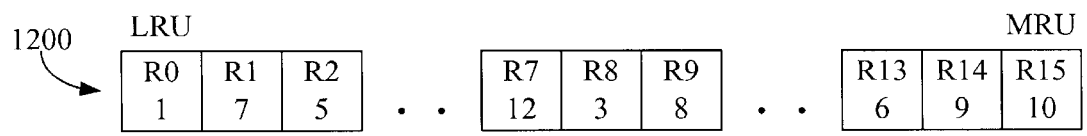

FIG. 21C shows the result when the next CCB used had already been cached in SRAM. In this example, the CCB was cached in an SRAM unit corresponding to number 10, and so after employment of that CCB, number 10 is stored in the MRU block. Only those numbers which had previously been more recently used than number 10 (register blocks R9–R15) are shifted to the left, leaving the number 1 in the LRU block. In this manner the INIC maintains the most active CCBs in SRAM cache.

Figure 21D:
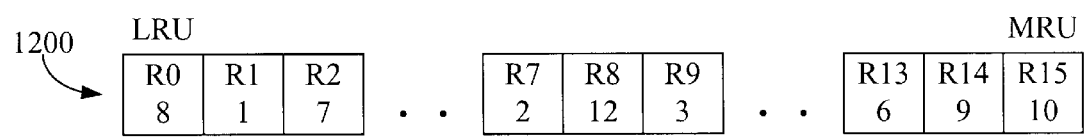

In some cases a CCB being used is one that is not desirable to hold in the limited cache memory. For example, it is preferable not to cache a CCB for a context that is known to be closing, so that other cached CCBs can remain in SRAM longer. In this case, the number representing the cache unit holding the decacheable CCB is stored in the LRU block R0 rather than the MRU block R15, so that the decacheable CCB will be replaced immediately upon employment of a new CCB that is cached in the SRAM unit corresponding to the number held in the LRU block R0. FIG. 21D shows the case for which number 8 (which had been in block R9 in FIG. 21C) corresponds to a CCB that will be used and then closed. In this case number 8 has been removed from block R9 and stored in the LRU block R0. All the numbers that had previously been stored to the left of block R9 (R1–R8) are then shifted one block to the right.

Figure 22:
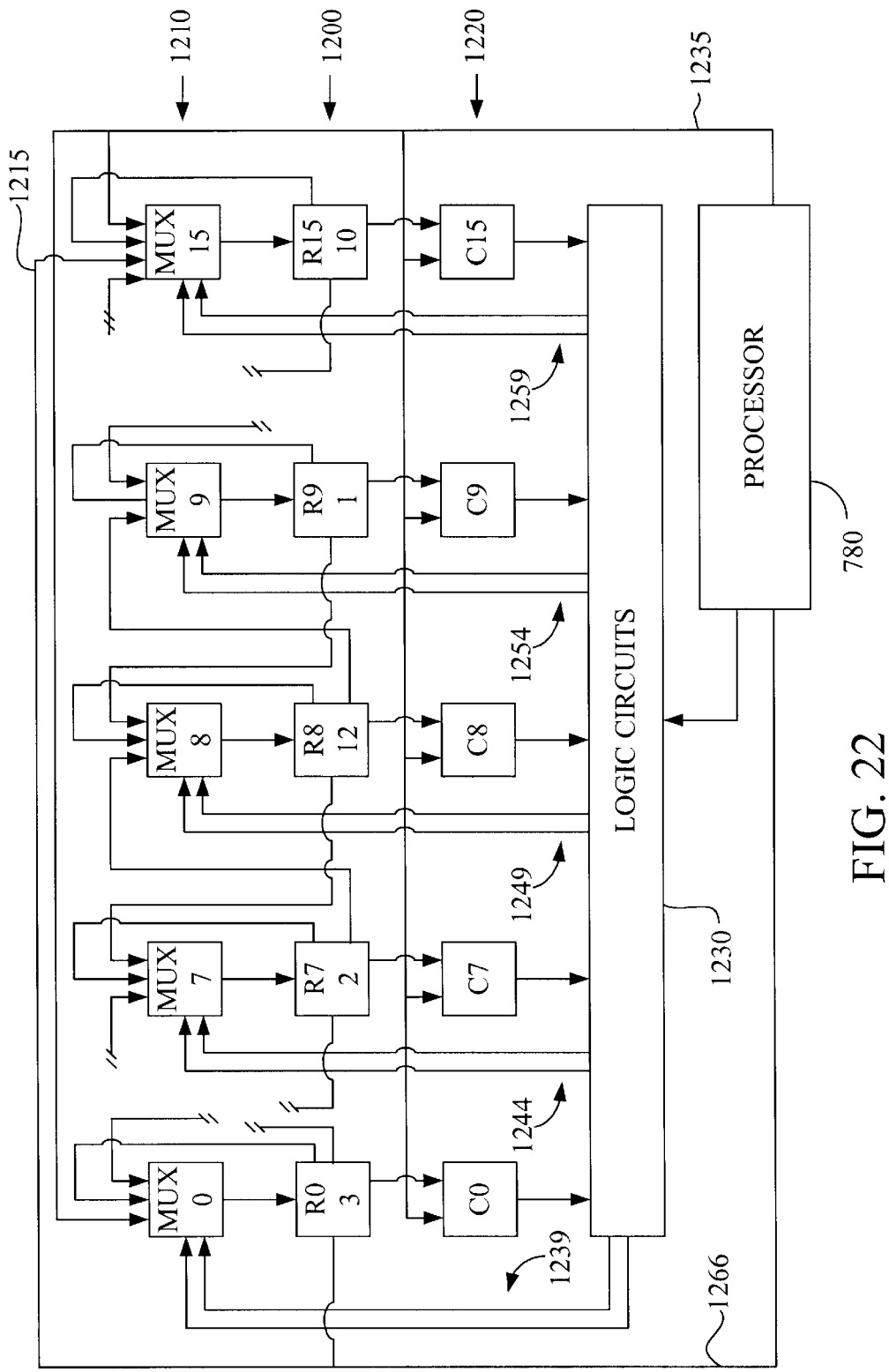
FIG. 22 is a diagram of the devices used to operate the least-recently-used register of FIGS. 21A–D.

FIG. 22 shows some of the logical units employed to operate the least-recently-used register 1200. An array of sixteen, three or four input multiplexers 1210, of which only multiplexers MUX0, MUX7, MUX8, MUX9 and MUX15 are shown for clarity, have outputs fed into the corresponding sixteen blocks of least-recently-used register 1200. For example, the output of MUX0 is stored in block R0, the output of MUX7 is stored in block R7, etc. The value of each of the register blocks is connected to an input for its corresponding multiplexer and also into inputs for both adjacent multiplexers, for use in shifting the block numbers. For instance, the number stored in R8 is fed into inputs for MUX7, MUX8 and MUX9. MUX0 and MUX15 each have only one adjacent block, and the extra input for those multiplexers is used for the selection of LRU and MRU blocks, respectively. MUX15 is shown as a four-input multiplexer, with input 1215 providing the number stored on R0.

An array of sixteen comparators 1220 each receives the value stored in the corresponding block of the least-recently-used register 1200. Each comparator also receives a signal from processor 470 along line 1235 so that the register block having a number matching that sent by processor 470 outputs true to logic circuits 1230 while the other fifteen comparators output false. Logic circuits 1230 control a pair of select lines leading to each of the multiplexers, for selecting inputs to the multiplexers and therefore controlling shifting of the register block numbers. Thus select lines 1239 control MUX0, select lines 1244 control MUX7, select lines 1249 control MUX8, select lines 1254 control MUX9 and select lines 1259 control MUX15.

When a CCB is to be used, processor 470 checks to see whether the CCB matches a CCB currently held in one of the sixteen cache units. If a match is found, the processor sends a signal along line 1235 with the block number corresponding to that cache unit, for example number 12. Comparators 1220 compare the signal from that line 1235 with the block numbers and comparator C8 provides a true output for the block R8 that matches the signal, while all the other comparators output false. Logic circuits 1230, under control from the processor 470, use select lines 1259 to choose the input from line 1235 for MUX15, storing the number 12 in the MRU block R15. Logic circuits 1230 also send signals along the pairs of select lines for MUX8 and higher multiplexers, aside from MUX15, to shift their output one block to the left, by selecting as inputs to each multiplexer MUX8 and higher the value that had been stored in register blocks one block to the right (R9–R15). The outputs of multiplexers that are to the left of MUX8 are selected to be constant.

If processor 470 does not find a match for the CCB among the sixteen cache units, on the other hand, the processor reads from LRU block R0 along line 1266 to identify the cache corresponding to the LRU block, and writes the data stored in that cache to DRAM. The number that was stored in R0, in this case number 3, is chosen by select lines 1259 as input 1215 to MUX15 for storage in MRU block R15. The other fifteen multiplexers output to their respective register blocks the numbers that had been stored each register block immediately to the right.

For the situation in which the processor wishes to remove a CCB from the cache after use, the LRU block R0 rather than the MRU block R15 is selected for placement of the number corresponding to the cache unit holding that CCB. The number corresponding to the CCB to be placed in the LRU block R0 for removal from SRAM (for example number 1, held in block R9) is sent by processor 470 along line 1235, which is matched by comparator C9. The processor instructs logic circuits 1230 to input the number 1 to R0, by selecting with lines 1239 input 1235 to MUX0. Select lines 1254 to MUX9 choose as input the number held in register block R8, so that the number from R8 is stored in R9. The numbers held by the other register blocks between R0 and R9 are similarly shifted to the right, whereas the numbers in register blocks to the right of R9 are left constant. This frees scarce cache memory from maintaining closed CCBs for many cycles while their identifying numbers move through register blocks from the MRU to the LRU blocks.

Figure 23:
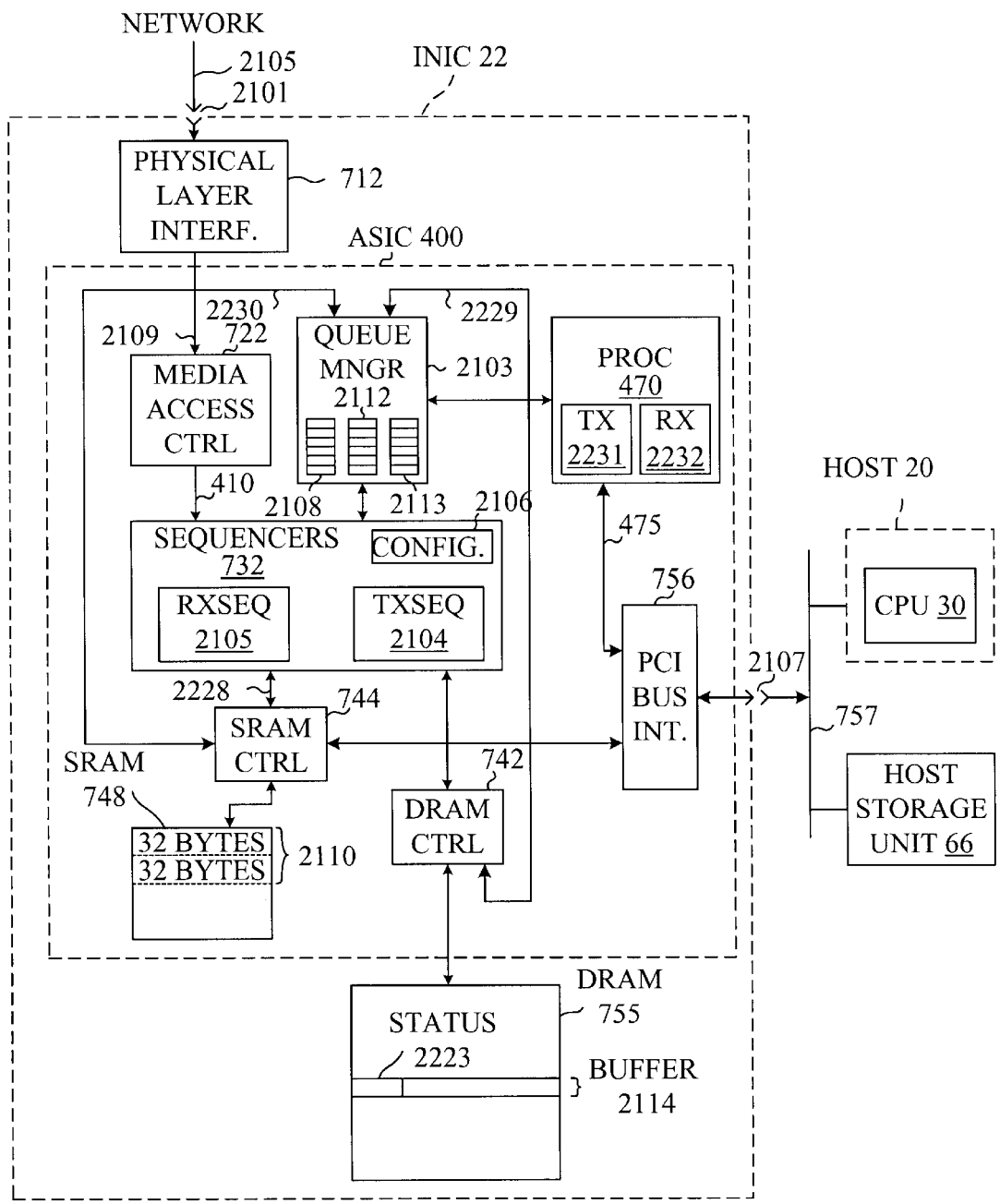
FIG. 23 is another diagram of the INIC of FIG. 15.

FIG. 23 illustrates additional details of INIC 22, focusing in this description on a single network connection. INIC 22 includes PHY chip 712, ASIC chip 700 and DRAM 755. PHY chip 712 couples INIC card 22 to network line 2105 via a network connector 2101. INIC 22 is coupled to the CPU of the host (for example, CPU 30 of host 20 of FIG. 1) via card edge connector 2107 and PCI bus 757. ASIC chip 700 includes a Media Access Control (MAC) unit 722, a sequencers block 732, SRAM control 744, SRAM 748, DRAM control 742, a queue manager 803, a processor 780, and a PCI bus interface unit 756. Sequencers block 732 includes a transmit sequencer 2104, a receive sequencer 2105, and configuration registers 2106. A MAC destination address is stored in configuration register 2106. Part of the program code executed by processor 780 is contained in ROM (not shown) and part is located in a writeable control store SRAM (not shown). The program may be downloaded into the writeable control store SRAM at initialization from the host 20.

Figure 24:
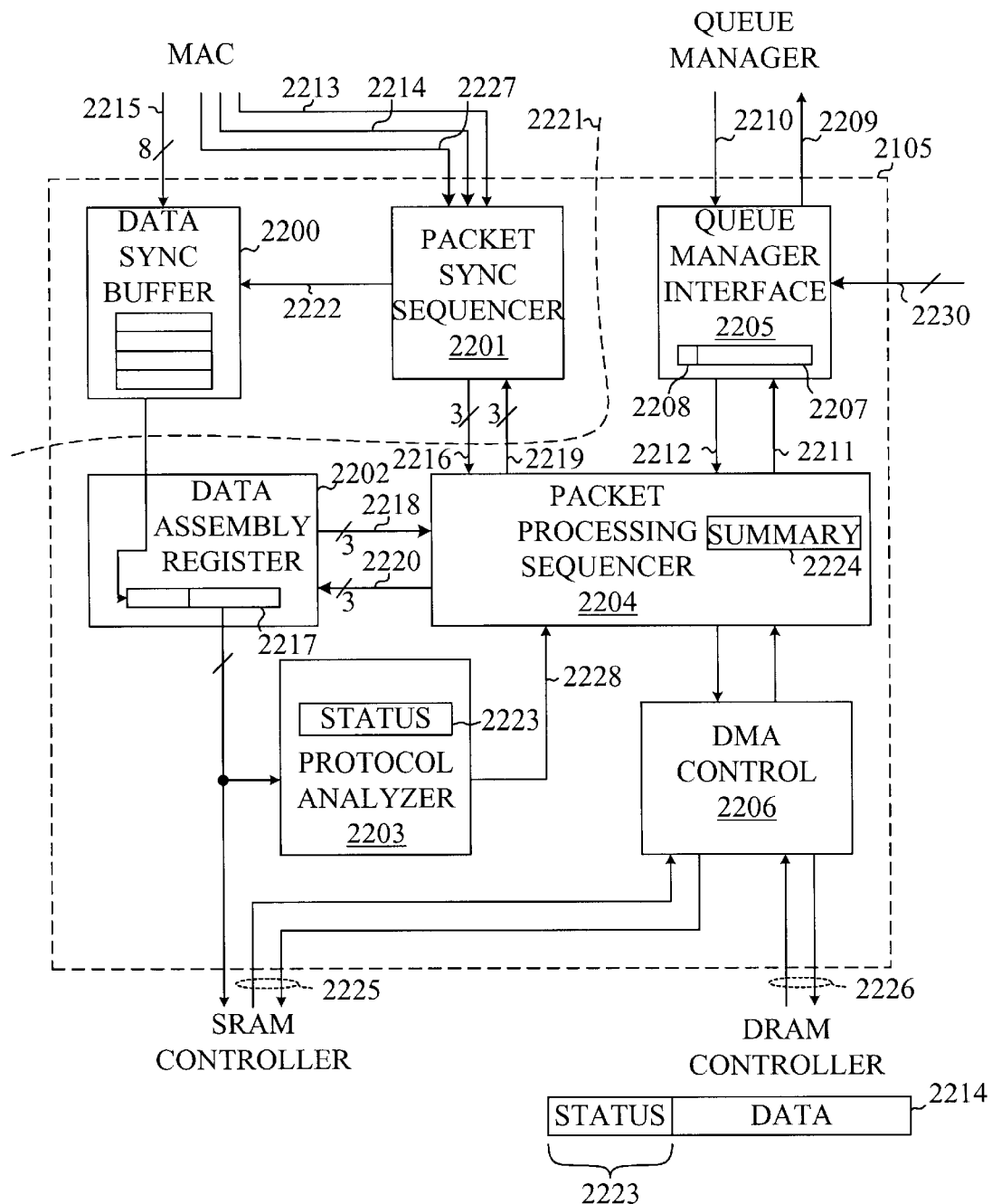
FIG. 24 is a more detailed diagram of the receive sequencer 2105 of FIG. 23.

FIG. 24 is a more detailed diagram of the receive sequencer 2105 of FIG. 23. Receive sequencer 2105 includes a data synchronization buffer 2200, a packet synchronization sequencer 2201, a data assembly register 2202, a protocol analyzer 2203, a packet processing sequencer 2204, a queue manager interface 2205, and a Direct Memory Access (DMA) control block 2206. The packet synchronization sequencer 2201 and data synchronization buffer 2200 utilize a network-synchronized clock of MAC 722, whereas the remainder of the receive sequencer 2105 utilizes a fixed-frequency clock. Dashed line 2221 indicates the clock domain boundary.

Operation of receive sequencer 2105 of FIGS. 23 and 24 is now described in connection with the receipt onto INIC 22 of a TCP/IP packet from network line 702. At initialization time, processor 780 partitions DRAM 755 into buffers. Receive sequencer 2105 uses the buffers in DRAM 755 to store incoming network packet data as well as status information for the packet. Processor 780 creates a 32-bit buffer descriptor for each buffer. A buffer descriptor indicates the size and location in DRAM of its associated buffer. Processor 780 places these buffer descriptors on a "free-buffer queue" 2108 by writing the descriptors to the queue manager 803. Queue manager 803 maintains multiple queues including the "free-buffer queue" 2108. In this implementation, the heads and tails of the various queues are located in SRAM 748, whereas the middle portion of the queues are located in DRAM 755.

Lines 2229 comprise a request mechanism involving a request line and address lines. Similarly, lines 2230 comprise a request mechanism involving a request line and address lines. Queue manager 803 uses lines 2229 and 2230 to issue requests to transfer queue information from DRAM to SRAM or from SRAM to DRAM.

The queue manager interface 2205 of the receive sequencer always attempts to maintain a free buffer descriptor 2207 for use by the packet processing sequencer 2204. Bit 2208 is a ready bit that indicates that free-buffer descriptor 2207 is available for use by the packet processing sequencer 2204. If queue manager interface 2205 does not have a free buffer descriptor (bit 2208 is not set), then queue manager interface 2205 requests one from queue manager 803 via request line 2209. (Request line 2209 is actually a bus that communicates the request, a queue ID, a read/write signal and data if the operation is a write to the queue.)

In response, queue manager 803 retrieves a free buffer descriptor from the tail of the "free buffer queue" 2108 and then alerts the queue manager interface 2205 via an acknowledge signal on acknowledge line 2210. When queue manager interface 2205 receives the acknowledge signal, the queue manager interface 2205 loads the free buffer descriptor 2207 and sets the ready bit 2208. Because the free buffer descriptor was in the tail of the free buffer queue in SRAM 748, the queue manager interface 2205 actually receives the free buffer descriptor 2207 from the read data bus 2228 of the SRAM control block 744. Packet processing sequencer 2204 requests a free buffer descriptor 2207 via request line 2211. When the queue manager interface 2205 retrieves the free buffer descriptor 2207 and the free buffer descriptor 2207 is available for use by the packet processing sequencer, the queue manager interface 2205 informs the packet processing sequencer 2204 via grant line 2212. By this process, a free buffer descriptor is made available for use by the packet processing sequencer 2204 and the receive sequencer 2105 is ready to processes an incoming packet.

Next, a TCP/IP packet is received from the network line 2105 via network connector 2101 and Physical Layer Interface (PHY) 712. PHY 712 supplies the packet to MAC 722 via a Media Independent Interface (MII) parallel bus 2109. MAC 722 begins processing the packet and asserts a "start of packet" signal on line 2213 indicating that the beginning of a packet is being received. When a byte of data is received in the MAC and is available at the MAC outputs 2215, MAC 722 asserts a "data valid" signal on line 2214. Upon receiving the "data valid" signal, the packet synchronization sequencer 2201 instructs the data synchronization buffer 2200 via load signal line 2222 to load the received byte from data lines 2215. Data synchronization buffer 2200 is four bytes deep. The packet synchronization sequencer 2201 then increments a data synchronization buffer write pointer. This data synchronization buffer write pointer is made available to the packet processing sequencer 2204 via lines 2216. Consecutive bytes of data from data lines 2215 are clocked into the data synchronization buffer 2200 in this way.

A data synchronization buffer read pointer available on lines 2219 is maintained by the packet processing sequencer 2204. The packet processing sequencer 2204 determines that data is available in data synchronization buffer 2200 by comparing the data synchronization buffer write pointer on lines 2216 with the data synchronization buffer read pointer on lines 2219.

Data assembly register 2202 contains a sixteen-byte long shift register 2217. This register 2217 is loaded serially a single byte at a time and is unloaded in parallel. When data is loaded into register 2217, a write pointer is incremented. This write pointer is made available to the packet processing sequencer 2204 via lines 2218. Similarly, when data is unloaded from register 2217, a read pointer maintained by packet processing sequencer 2204 is incremented. This read pointer is available to the data assembly register 2202 via lines 2220. The packet processing sequencer 2204 can therefore determine whether room is available in register 2217 by comparing the write pointer on lines 2218 to the read pointer on lines 2220.

If the packet processing sequencer 2204 determines that room is available in register 2217, then packet processing sequencer 2204 instructs data assembly register 2202 to load a byte of data from data synchronization buffer 2200. The data assembly register 2202 increments the data assembly register write pointer on lines 2218 and the packet processing sequencer 2204 increments the data synchronization buffer read pointer on lines 2219. Data shifted into register 2217 is examined at the register Outputs by protocol analyzer 2203 which verifies checksums, and generates "status" information 2223.

DMA control block 2206 is responsible for moving information from register 2217 to buffer 2114 via a sixty-four byte receive FIFO 2110. DMA control block 2206 implements receive FIFO 2110 as two thirty-two byte ping-pong buffers using sixty-four bytes of SRAM 748. DMA control block 2206 implements the receive FIFO using a write-pointer and a read-pointer. When data to be transferred is available in register 2217 and space is available in FIFO 2110, DMA control block 2206 asserts an SRAM write request to SRAM controller 744 via lines 2225. SRAM controller 744 in turn moves data from register 2217 to FIFO 2110 and asserts an acknowledge signal back to DMA control block 2206 via lines 2225. DMA control block 2206 then increments the receive FIFO write pointer and causes the data assembly register read pointer to be incremented.

When thirty-two bytes of data has been deposited into receive FIFO 2110, DMA control block 2206 presents a DRAM write request to DRAM controller 742 via lines 2226. This write request consists of the free buffer descriptor 2207 ORed with a "buffer load count" for the DRAM request address, and the receive FIFO read pointer for the SRAM read address. Using the receive FIFO read pointer, the DRAM controller 742 asserts a read request to SRAM controller 744. SRAM controller 744 responds to DRAM controller 742 by returning the indicated data from the receive FIFO 2110 in SRAM 748 and asserting an acknowledge signal. DRAM controller 742 stores the data in a DRAM write data register, stores a DRAM request address in a DRAM address register, and asserts an acknowledge to DMA control block 2206. The DMA control block 2206 then decrements the receive FIFO read pointer. Then the DRAM controller 742 moves the data from the DRAM write data register to buffer 2114. In this way, as consecutive thirty-two byte chunks of data are stored in SRAM 748, DRAM control block 2206 moves those thirty-two byte chunks of data one at a time from SRAM 748 to buffer 2214 in DRAM 755. Transferring thirty-two byte chunks of data to the DRAM 755 in this fashion allows data to be written into the DRAM using the relatively efficient burst mode of the DRAM.

Packet data continues to flow from network line 2105 to buffer 2114 until all packet data has been received. MAC 722 then indicates that the incoming packet has completed by asserting an "end of frame" (i.e., end of packet) signal on line 2227 and by presenting final packet status (MAC packet status) to packet synchronization sequencer 2204. The packet processing sequencer 2204 then removes the status 2223 (also called "protocol analyzer status") and the MAC packet status to register 2217 for eventual transfer to buffer 2114. After all the data of the packet has been placed in buffer 2214, status 2223 and the MAC packet status is transferred to buffer 2214 so that it is stored prepended to the associated data as shown in FIG. 22.

After all data and status has been transferred to buffer 2114, packet processing sequencer 2204 creates a summary 2224 (also called a "receive packet descriptor") by concatenating the free buffer descriptor 2207, the buffer load-count, the MAC ID, and a status bit (also called an "attention bit"). If the attention bit is a one, then the packet is not a "fast-path candidate"; whereas if the attention bit is a zero, then the packet is a "fast-path candidate". The value of the attention bit represents the result of a significant amount of processing that processor 780 would otherwise have to do to determine whether the packet is a "fast-path candidate". For example, the attention bit being a zero indicates that the packet employs both TCP protocol and IP protocol. By carrying out this significant amount of processing in hardware beforehand and then encoding the result in the attention bit, subsequent decision making by processor 780 as to whether the packet is an actual "fast-path packet" is accelerated.

Packet processing sequencer 2204 then sets a ready bit (not shown) associated with summary 2224 and presents summary 2224 to queue manager interface 2205. Queue manager interface 2205 then requests a write to the head of a "summary queue" 2112 (also called the "receive descriptor queue"). The queue manager 803 receives the request, writes the summary 2224 to the head of the summary queue 2212, and asserts an acknowledge signal back to queue manager interface via line 2210. When queue manager interface 2205 receives the acknowledge, queue manager interface 2205 informs packet processing sequencer 2204 that the summary 2224 is in summary queue 2212 by clearing the ready bit associated with the summary. Packet processing sequencer 2204 also generates additional status information (also called a "vector") for the packet by concatenating the MAC packet status and the MAC ID. Packet processing sequencer 2204 sets a ready bit (not shown) associated with this vector and presents this vector to the queue manager interface 2205. The queue manager interface 2205 and the queue manager 803 then cooperate to write this vector to the head of a "vector queue" 2113 in similar fashion to the way summary 2224 was written to the head of summary queue 2112 as described above. When the vector for the packet has been written to vector queue 2113, queue manager interface 2205 resets the ready bit associated with the vector.

Once summary 2224 (including a buffer descriptor that points to buffer 2114) has been placed in summary queue 2112 and the packet data has been placed in buffer 2144, processor 780 can retrieve summary 2224 from summary queue 2112 and examine the "attention bit".

If the attention bit from summary 2224 is a digital one, then processor 780 determines that the packet is not a "fast-path candidate" and processor 780 need not examine the packet headers. Only the status 2223 (first sixteen bytes) from buffer 2114 are DMA transferred to SRAM so processor 780 can examine it. If the status 2223 indicates that the packet is a type of packet that is not to be transferred to the host (for example, a multicast frame that the host is not registered to receive), then the packet is discarded (i.e., not passed to the host). If status 2223 does not indicate that the packet is the type of packet that is not to be transferred to the host, then the entire packet (headers and data) is passed to a buffer on host 20 for "slow-path" transport and network layer processing by the protocol stack of host 20.

If, on the other hand, the attention bit is a zero, then processor 780 determines that the packet is a "fast-path candidate". If processor 780 determines that the packet is a "fast-path candidate", then processor 780 uses the buffer descriptor from the summary to DMA transfer the first approximately 96 bytes of information from buffer 2114 from DRAM 755 into a portion of SRAM 748 so processor 780 can examine it. This first approximately 96 bytes contains status 2223 as well as the IP source address of the IP header, the IP destination address of the IP header, the TCP source address of the TCP header, and the TCP destination address of the TCP header. The IP source address of the IP header, the IP destination address of the IP header, the TCP source address of the TCP header, and the TCP destination address of the TCP header together uniquely define a single connection context (TCB) with which the packet is associated. Processor 780 examines these addresses of the TCP and IP headers and determines the connection context of the packet. Processor 780 then checks a list of connection contexts that are under the control of INIC 22 and determines whether the packet is associated with a connection context (TCB) under the control of INIC 22.

If the connection context is not in the list, then the "fast-path candidate" packet is determined not to be a "fast-path packet." In such a case, the entire packet (headers and data) is transferred to a buffer in host 20 for "slow-path" processing by the protocol stack of host 20.

If, on the other hand, the connection context is in the list, then software executed by processor 780 including software state machines 2231 and 2232 checks for one of numerous exception conditions and determines whether the packet is a "fast-path packet" or is not a "fast-path packet". These exception conditions include: 1) IP fragmentation is detected; 2) an IP option is detected; 3) an unexpected TCP flag (urgent bit set, reset bit set, SYN bit set or FIN bit set) is detected; 4) the ACK field in the TCP header is before the TCP window, or the ACK field in the TCP header is after the TCP window, or the ACK field in the TCP header shrinks the TCP window; 5) the ACK field in the TCP header is a duplicate ACK and the ACK field exceeds the duplicate ACK count (the duplicate ACK count is a user settable value); and 6) the sequence number of the TCP header is out of order (packet is received out of sequence). If the software executed by processor 780 detects one of these exception conditions, then processor 780 determines that the "fast-path candidate" is not a "fast-path packet." In such a case, the connection context for the packet is "flushed" (the connection context is passed back to the host) so that the connection context is no longer present in the list of connection contexts under control of INIC 22. The entire packet (headers and data) is transferred to a buffer in host 20 for "slow-path" transport layer and network layer processing by the protocol stack of host 20.

If, on the other hand, processor 780 finds no such exception condition, then the "fast-path candidate" packet is determined to be an actual "fast-path packet". The receive state machine 2232 then processes of the packet through TCP. The data portion of the packet in buffer 2114 is then transferred by another DMA controller (not shown in FIG. 21) from buffer 2114 to a host-allocated file cache in storage 35 of host 20. In one embodiment, host 20 does no analysis of the TCP and IP headers of a "fast-path packet". All analysis of the TCP and IP headers of a "fast-path packet" is done on INIC card 20.

Figure 25:
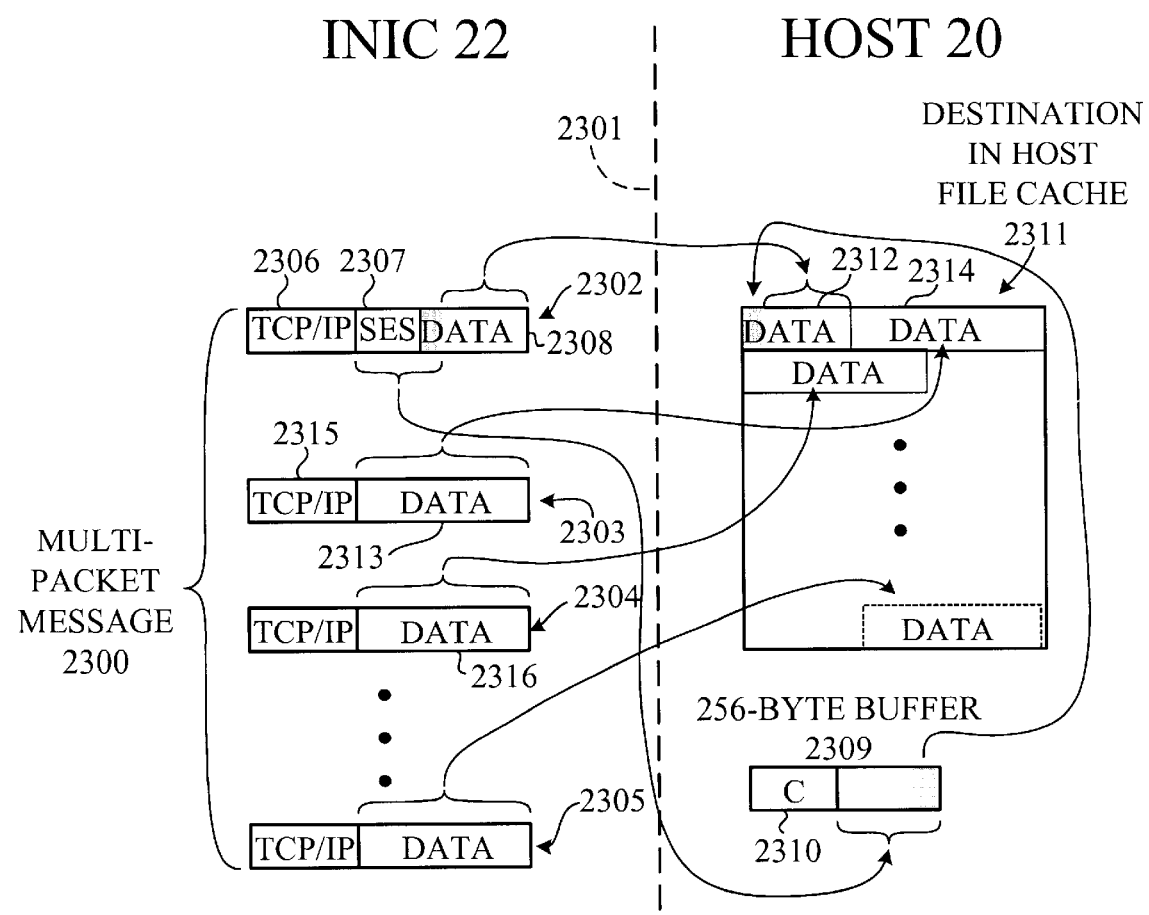
FIG. 25 is a diagram illustrating the transfer of data of fast-path packets from an INIC to a host.

FIG. 25 is a diagram illustrating the transfer of data of "fast-path packets" (packets of a 64 k-byte session layer message 2300) from INIC 22 to host 20. The portion of the diagram to the left of the dashed line 2301 represents INIC 22, whereas the portion of the diagram to the right of the dashed line 2301 represents host 20. The 64 k-byte session layer message 2300 includes approximately forty-five packets, four of which (2302, 2303, 2304 and 2305) are labeled on FIG. 23. The first packet 2302 includes a portion 2306 containing transport and network layer headers (for example, TCP and IP headers), a portion 2307 containing a session layer header, and a portion 2308 containing data. In a first step, portion 2307, the first few bytes of data from portion 2308, and the connection context identifier 2310 of the packet 2300 are transferred from INIC 22 to a 256-byte buffer 2309 in host 20. In a second step, host 20 examines this information and returns to INIC 22 a destination (for example, the location of a file cache 2311 in storage 35) for the data. Host 20 also copies the first few bytes of the data from buffer 2309 to the beginning of a first part 2312 of file cache 2311. In a third step, INIC 22 transfers the remainder of the data from portion 2308 to host 20 such that the remainder of the data is stored in the remainder of first part 2312 of file cache 2311. No network, transport, or session layer headers are stored in first part 2312 of file cache 2311. Next, the data portion 2313 of the second packet 2303 is transferred to host 20 such that the data portion 2313 of the second packet 2303 is stored in a second part 2314 of file cache 2311. The transport layer and network layer header portion 2315 of second packet 2303 is not transferred to host 20. There is no network, transport, or session layer header stored in file cache 2311 between the data portion of first packet 2302 and the data portion of second packet 2303. Similarly, the data portion 2316 of the next packet 2304 of the session layer message is transferred to file cache 2311 so that there is no network, transport, or session layer headers between the data portion of the second packet 2303 and the data portion of the third packet 2304 in file cache 2311. In this way, only the data portions of the packets of the session layer message are placed in the file cache 2311. The data from the session layer message 2300 is present in file cache 2311 as a block such that this block contains no network, transport, or session layer headers.

In the case of a shorter, single-packet session layer message, portions 2307 and 2308 of the session layer message are transferred to 256-byte buffer 2309 of host 20 along with the connection context identifier 2310 as in the case of the longer session layer message described above. In the case of a single-packet session layer message, however, the transfer is completed at this point. Host 20 does not return a destination to INIC 22 and INIC 22 does not transfer subsequent data to such a destination.

All told, the above-described devices and systems for processing of data communication provide dramatic reductions in the time and host resources required for processing large, connection-based messages. Protocol processing speed and efficiency is tremendously accelerated by an intelligent network interface card (INIC) containing specially designed protocol processing hardware, as compared with a general purpose CPU running conventional protocol software, and interrupts to the host CPU are also substantially reduced. These advantages are magnified for network storage applications, in which case data from file transfers may also avoid both the host memory bus and host I/O bus, with control of the file transfers maintained by the host.

What is claimed is:

1. An apparatus for transferring information between a network and a storage unit, the apparatus comprising:
   a host computer having a CPU operating a file system and a host memory connected to said CPU by a host memory bus, and
   an interface device coupled to said host computer, to the network and to the storage unit, said interface device including an interface memory containing an interface file cache adapted to store data that is communicated between the network and the storage unit, wherein said interface file cache is controlled by said file system, said data is affixed to headers including a transport layer header, and said interface device includes a mechanism configured to process said transport layer header.

2. The apparatus of claim 1, wherein said host computer is configured to create a communication control block and pass said communication control block to the interface device, which is configured to communicate said data between the network and the file cache according to the communication control block.

3. The apparatus of claim 1, wherein said host computer is configured to create a communication control block and pass said communication control block to said interface device, and said interface device is configured to communicate said data between the storage unit and said file cache according to said communication control block.

4. The apparatus of claim 1, wherein said data does not enter said host computer.

5. The apparatus of claim 1, wherein said data is communicated between the network and said interface device in a file format, and said data is communicated between said interface device and the storage unit in a block format.

6. The apparatus of claim 1, wherein said interface device includes a mechanism configured to select whether to transfer said data between the network and the storage unit via a first path that includes said host or via a second path that excludes said host.

7. The apparatus of claim 1, wherein said interface device includes a SCSI controller that is coupled to the storage unit.

8. The apparatus of claim 1, wherein said interface device includes a Fibre Channel controller that is coupled to the storage unit.

9. The apparatus of claim 1, wherein said interface device includes a RAID controller that is coupled to the storage unit.

10. The apparatus of claim 1, wherein said interface device includes a plurality of network ports, with a first of said network ports being coupled the network, and a second of said network ports being coupled to the storage unit.

11. The apparatus of claim 1, further comprising a second interface device coupled to said host computer, to the network and to a second storage unit, said second interface device including a second interface memory containing a second interface file cache adapted to store data that is communicated between the network and the second storage unit, wherein said second interface file cache is controlled by said file system.

12. An apparatus for transferring information between a network and a storage unit, the apparatus comprising:

a host computer having a processor connected to a host memory by a host memory bus, said host memory containing a protocol stack operable by the processor to create a communication control block defining a network connection, and an interface device connected to said host computer and coupled between the network and the storage unit, said interface device including an interface memory adapted to store said communication control block and a mechanism configured to associate data with said communication control block such that said data is communicated between the network and the storage unit without encountering said host computer.

13. The apparatus of claim 12, wherein said host computer contains a file system and said interface memory includes a file cache adapted to store said data, wherein said file system manages storage of said data in said file cache.

14. The apparatus of claim 12, wherein said data travels over the network in at least one packet containing a transport layer header, and said interface device includes circuitry for processing said header.

15. The apparatus of claim 12, wherein said interface device is coupled to said host computer by an input/output bus and said communication control block travels over said input/output bus between said interface device and said host computer.

16. The apparatus of claim 12, wherein said interface device further comprises a SCSI controller that is coupled to the storage unit.

17. The apparatus of claim 12, wherein said interface device further comprises a Fibre Channel controller that is coupled to the storage unit.

18. The apparatus of claim 12, wherein said interface device further comprises a RAID controller that is coupled to the storage unit.

19. The apparatus of claim 12, wherein said interface device further comprises a plurality of network ports, with a first of said ports coupled to the network and a second of said ports coupled to the storage unit.

20. The apparatus of claim 12, further comprising a second interface device connected to said host computer and coupled between the network and a second storage unit, said second interface device including a second interface memory adapted to store a second communication control block and a second mechanism for associating data with said second communication control block such that said data is communicated between the network and said second storage unit without encountering said host computer.

21. A server connectable to a network and a storage unit, the server comprising:

a host computer, a network interface device coupled to said host computer, and a first storage unit coupled to said network interface device by an input/output controller, wherein said host computer chooses whether to move data between the network and the storage unit via said host computer or to bypass said host computer and move data directly between the network and the storage unit.

22. The server of claim 21, further comprising a second storage unit coupled to said host computer, wherein said host computer determines whether to communicate a file block between said network interface device and said first storage unit or said second storage unit.

23. The server of claim 21, further comprising a second network interface device coupled to said host computer, and a second storage unit coupled to said second network interface device by a second input/output controller, wherein said second network interface device chooses whether to move information between the network and the second storage unit via said host computer or to bypass said host computer and move data directly between the network and the second storage unit.

24. An apparatus for storing, retrieving or communicating information over a network, the apparatus comprising:

a host computer having a CPU, a file system and a protocol stack for processing network messages, and a plurality of network interface devices connected to and managed by said host computer, each of said network interface devices being coupled to a network and to a storage unit, having hardware logic circuits configured to process headers of network packets and create a summary of said headers, and having a file cache adapted to store data from said packets as a file for transfer to or from said storage unit, said file caches managed by said file system.

* * * * *